US009350908B1

(12) United States Patent
Hsu et al.

(10) Patent No.: US 9,350,908 B1
(45) Date of Patent: May 24, 2016

(54) MOBILE DEVICE AND OPTICAL IMAGING LENS THEREOF

(71) Applicant: GeniuS Electronic Optical Co., Ltd., Taichung (TW)

(72) Inventors: Sheng Wei Hsu, Taichung (TW); Tzu-Chien Tang, Taichung (TW)

(73) Assignee: GENIUS ELECTRONIC OPTICAL CO., LTD. (TW)

( * ) Notice: Subject to any disclaimer, the term of this patent is extended or adjusted under 35 U.S.C. 154(b) by 0 days.

(21) Appl. No.: 14/696,238

(22) Filed: Apr. 24, 2015

(30) Foreign Application Priority Data

Feb. 13, 2015 (TW) .............................. 104105136 A

(51) Int. Cl.
| | | |
|---|---|---|
| *G02B 13/18* | (2006.01) | |
| *G02B 9/08* | (2006.01) | |
| *G02B 9/60* | (2006.01) | |
| *H04N 5/225* | (2006.01) | |
| *G02B 13/00* | (2006.01) | |
| *G02B 5/00* | (2006.01) | |
| *G02B 27/00* | (2006.01) | |

(52) U.S. Cl.
CPC .......... *H04N 5/2254* (2013.01); *G02B 13/0045* (2013.01); *H04N 5/2252* (2013.01); *G02B 5/005* (2013.01); *G02B 9/60* (2013.01); *G02B 13/002* (2013.01); *G02B 13/0015* (2013.01); *G02B 13/18* (2013.01); *G02B 27/0025* (2013.01)

(58) Field of Classification Search
CPC ...... G02B 13/0045; G02B 9/60; G02B 13/18; G02B 27/0025; G02B 13/0015; G02B 5/005; G02B 13/002
USPC .................................. 359/714, 739, 763, 764
See application file for complete search history.

(56) References Cited

U.S. PATENT DOCUMENTS

| | | | | |
|---|---|---|---|---|
| 8,917,457 B2 * | 12/2014 | Matsusaka | ............. | G02B 13/18 359/713 |
| 2013/0021680 A1 | 1/2013 | Chen et al. | | |
| 2013/0215522 A1 * | 8/2013 | Chen | ........................ | G02B 9/60 359/714 |
| 2013/0258185 A1 * | 10/2013 | Chang | ................ | G02B 13/0045 359/714 |
| 2014/0029117 A1 | 1/2014 | Noda | | |
| 2014/0092487 A1 | 4/2014 | Chen et al. | | |
| 2014/0118613 A1 * | 5/2014 | Chang | ................ | G02B 13/0045 359/764 |
| 2014/0139698 A1 * | 5/2014 | Fukuta | ............... | G02B 13/0045 359/714 |
| 2014/0153114 A1 * | 6/2014 | Suzuki | ............... | G02B 13/0045 359/714 |
| 2014/0218584 A1 * | 8/2014 | Liou | .................. | G02B 13/0015 359/763 |
| 2015/0009392 A1 * | 1/2015 | Chiang | .............. | G02B 13/0045 359/714 |
| 2015/0116846 A1 * | 4/2015 | Noda | ........................ | G02B 3/04 359/714 |
| 2015/0198789 A1 * | 7/2015 | Tanaka | ..................... | G02B 3/04 359/714 |

FOREIGN PATENT DOCUMENTS

| | | |
|---|---|---|
| TW | 201213926 | 4/2012 |
| TW | 201317615 | 5/2013 |
| TW | 201428333 | 7/2014 |
| TW | 201447360 | 12/2014 |

* cited by examiner

*Primary Examiner* — Evelyn A Lester
(74) *Attorney, Agent, or Firm* — Baker & McKenzie LLP

(57) ABSTRACT

The present disclosure provides a mobile device and an optical imaging lens thereof. The optical imaging lens may comprise five lens elements positioned in an order from an object side to an image side. Through controlling the convex or concave shape of the surfaces of the lens elements, the optical imaging lens may exhibit better optical characteristics and the total length of the optical imaging lens may be shortened.

19 Claims, 28 Drawing Sheets

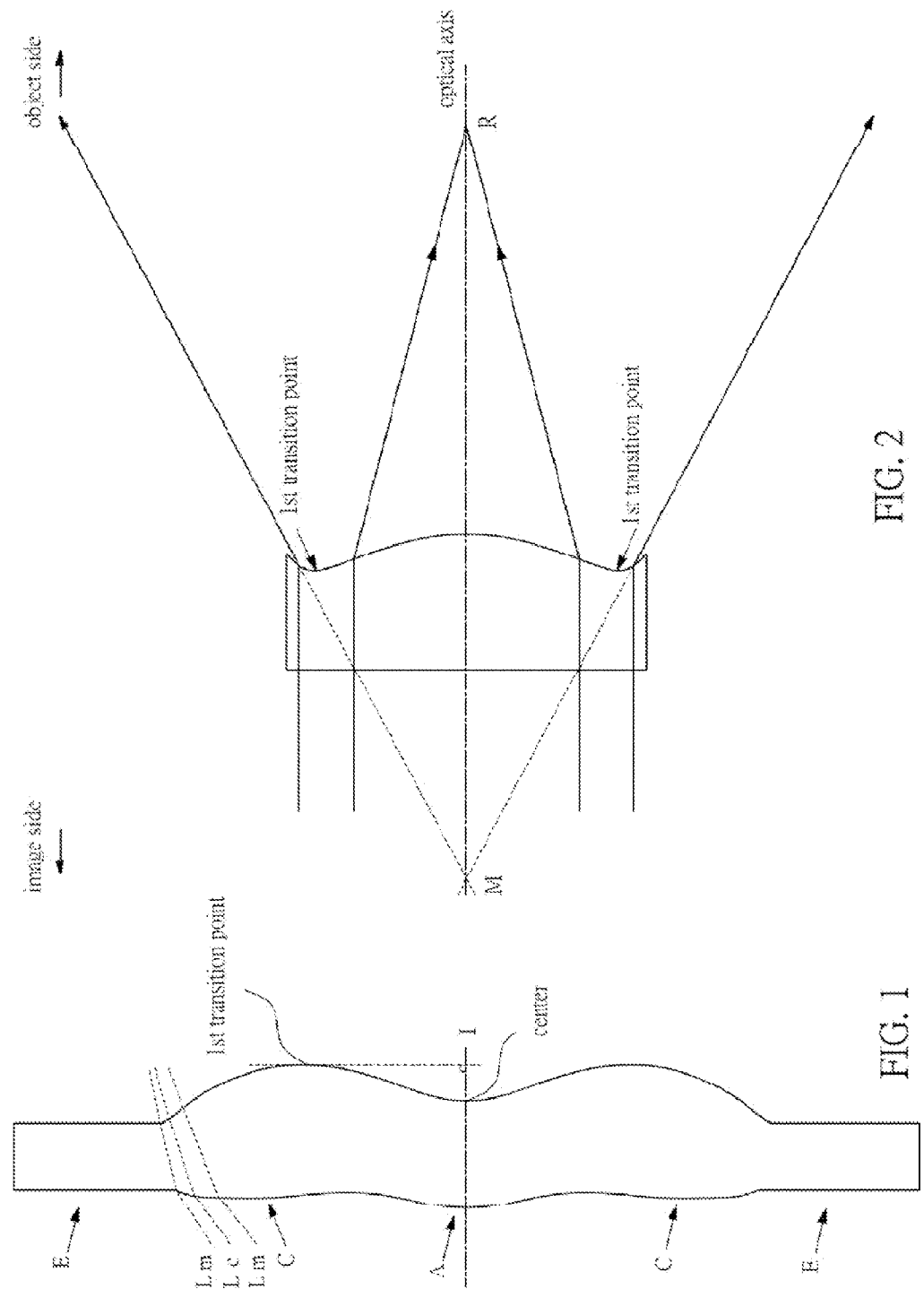

| \multicolumn{7}{|c|}{EFL(Effective focus length)= 3.61mm, HFOV(Half angular field of view)= 40.64deg., System length=4.204mm, Image height= 3.17mm, Fno=2.199} |
|---|---|---|---|---|---|---|
| Surface # | | Radius | Thickness | Refractive index | Abbe number | Focus | Material |
| - | Object | ∞ | | | | | |
| 100 | Aperture stop | ∞ | -0.2767_TA | | | | |
| 111 | 1st lens element | 1.3289 | 0.6283_T1 | 1.546_n1 | 56.114_v1 | 3.181_f1 | plastic |
| 112 | | 4.7143 | 0.0850_G12 | | | | |
| 121 | 2nd lens element | 18.4728 | 0.2000_T2 | 1.648_n2 | 22.397_v2 | -8.142_f2 | plastic |
| 122 | | 4.0864 | 0.3550_G23 | | | | |
| 131 | 3rd lens element | 4.1587 | 0.2215_T3 | 1.648_n3 | 22.397_v3 | 206.731_f3 | plastic |
| 132 | | 4.2021 | 0.2803_G34 | | | | |
| 141 | 4th lens element | -3.3141 | 0.5578_T4 | 1.546_n4 | 56.114_v4 | 2.936_f4 | plastic |
| 142 | | -1.1447 | 0.4331_G45 | | | | |
| 151 | 5th lens element | -8.4397 | 0.4248_T5 | 1.546_n5 | 56.114_v5 | -2.512_f5 | plastic |
| 152 | | 1.6668 | 0.4635_G5F | | | | |
| 161 | IR cut filter | ∞ | 0.2100_TF | 1.518_n6 | 64.166 | | plastic |
| 162 | | ∞ | 0.3447_GFP | | | | |
| 170 | Image plane | ∞ | 0.0000 | | | | glass |

FIG. 8

| | Aspherical parameters | | | | |
|---|---|---|---|---|---|
| Surface # | 111 | 112 | 121 | 122 | 131 |
| K | 0.000000E+00 | 0.000000E+00 | 0.000000E+00 | 0.000000E+00 | 0.000000E+00 |
| $a_4$ | -7.898124E-03 | -1.349583E-01 | -1.985270E-01 | -5.885597E-02 | -2.159391E-01 |
| $a_6$ | 1.169698E-01 | 1.500842E-02 | 2.099232E-01 | 1.250620E-01 | -1.948890E-02 |
| $a_8$ | -4.657723E-01 | 7.043707E-01 | 9.574325E-01 | 1.695742E+00 | -3.220431E-02 |
| $a_{10}$ | 1.004206E+00 | -2.471759E+00 | -3.717576E+00 | -6.748353E+00 | 8.392023E-01 |
| $a_{12}$ | -1.025906E+00 | 3.044404E+00 | 4.626771E+00 | 1.272912E+01 | -2.118973E+00 |
| $a_{14}$ | 3.715789E-01 | -1.448848E+00 | -2.088475E+00 | -1.241103E+01 | 2.169403E+00 |
| $a_{16}$ | 0.000000E+00 | 0.000000E+00 | 0.000000E+00 | 5.205264E+00 | -8.308448E-01 |
| $a_{18}$ | 0.000000E+00 | 0.000000E+00 | 0.000000E+00 | 0.000000E+00 | 0.000000E+00 |
| $a_{20}$ | 0.000000E+00 | 0.000000E+00 | 0.000000E+00 | 0.000000E+00 | 0.000000E+00 |
| Surface # | 132 | 141 | 142 | 151 | 152 |
| K | 0.000000E+00 | 0.000000E+00 | -1.000000E+00 | 0.000000E+00 | -1.000000E+00 |
| $a_4$ | -1.564046E-01 | 3.766626E-02 | 1.356739E-01 | -8.294068E-02 | -2.749961E-01 |
| $a_6$ | 3.059459E-02 | 1.298618E-01 | -6.635092E-02 | -8.384142E-02 | 1.710251E-01 |
| $a_8$ | -5.272310E-01 | -1.071025E+00 | -1.655218E-01 | 1.281484E-01 | -9.458971E-02 |
| $a_{10}$ | 1.828243E+00 | 2.633772E+00 | 3.468079E-01 | -7.016653E-02 | 3.974660E-02 |
| $a_{12}$ | -2.990606E+00 | -3.537680E+00 | -2.148586E-01 | 2.206375E-02 | -1.203231E-02 |
| $a_{14}$ | 2.595930E+00 | 2.830193E+00 | 3.344291E-02 | -4.338372E-03 | 2.513572E-03 |
| $a_{16}$ | -1.125275E+00 | -1.329605E+00 | 1.692114E-02 | 5.274945E-04 | -3.422578E-04 |
| $a_{18}$ | 1.903713E-01 | 3.374319E-01 | -7.579199E-03 | -3.622812E-05 | 2.724360E-05 |
| $a_{20}$ | 0.000000E+00 | -3.568365E-02 | 8.791621E-04 | 1.070060E-06 | -9.551578E-07 |

FIG. 9

| \multicolumn{7}{l}{EFL(Effective focus length)= 3.61mm, HFOV(Half angular field of view)= 40.689deg., System length=4.226mm, Image height= 3.17mm, Fno=2.199} |
|---|---|---|---|---|---|---|
| Surface # | | Radius | Thickness | Refractive index | Abbe number | Focus | Material |
| - | Object | ∞ | | | | | |
| 200 | Aperture stop | ∞ | -0.2768_TA | | | | |
| 211 | 1st lens element | 1.3301 | 0.6170_T1 | 1.546_n1 | 56.114_v1 | 3.222_f1 | plastic |
| 212 | | 4.5617 | 0.0842_G12 | | | | |
| 221 | 2nd lens lement | 15.0231 | 0.2148_T2 | 1.648_n2 | 22.397_v2 | -8.660_f2 | plastic |
| 222 | | 4.0627 | 0.3661_G23 | | | | |
| 231 | 3rd lens element | 4.4560 | 0.2297_T3 | 1.648_n3 | 22.397_v3 | 295.599_f3 | plastic |
| 232 | | 4.4697 | 0.2857_G34 | | | | |
| 241 | 4th lens element | -3.2799 | 0.5686_T4 | 1.546_n4 | 56.114_v4 | 2.949_f4 | plastic |
| 242 | | -1.1462 | 0.4311_G45 | | | | |
| 251 | 5th lens element | -9.2486 | 0.4318_T5 | 1.546_n5 | 56.114_v5 | -2.510_f5 | plastic |
| 252 | | 1.6357 | 0.4635_G5F | | | | |
| 261 | IR cut filter | ∞ | 0.2100_TF | 1.518_n6 | 64.166 | | plastic |
| 262 | | ∞ | 0.3232_GFP | | | | |
| 270 | Image plane | ∞ | 0.0000 | | | | glass |

FIG. 12

| Aspherical parameters | | | | | |
|---|---|---|---|---|---|
| Surface # | 211 | 212 | 221 | 222 | 231 |
| K | 0.000000E+00 | 0.000000E+00 | 0.000000E+00 | 0.000000E+00 | 0.000000E+00 |
| $a_4$ | -3.373129E-03 | -1.308044E-01 | -1.833497E-01 | -4.892781E-02 | -2.119114E-01 |
| $a_6$ | 8.079305E-02 | 1.644117E-02 | 1.523388E-01 | 1.146067E-01 | 4.062841E-02 |
| $a_8$ | -3.169119E-01 | 5.681777E-01 | 8.744881E-01 | 1.352854E+00 | -2.449492E-01 |
| $a_{10}$ | 6.844428E-01 | -1.960728E+00 | -3.058445E+00 | -5.213728E+00 | 1.039963E+00 |
| $a_{12}$ | -6.841201E-01 | 2.366352E+00 | 3.621634E+00 | 9.856242E+00 | -2.014486E+00 |
| $a_{14}$ | 2.286847E-01 | -1.139453E+00 | -1.599915E+00 | -9.792183E+00 | 1.871386E+00 |
| $a_{16}$ | 0.000000E+00 | 0.000000E+00 | 0.000000E+00 | 4.241795E+00 | -6.870162E-01 |
| $a_{18}$ | 0.000000E+00 | 0.000000E+00 | 0.000000E+00 | 0.000000E+00 | 0.000000E+00 |
| $a_{20}$ | 0.000000E+00 | 0.000000E+00 | 0.000000E+00 | 0.000000E+00 | 0.000000E+00 |
| Surface # | 232 | 241 | 242 | 251 | 252 |
| K | 0.000000E+00 | 0.000000E+00 | -1.000000E+00 | 0.000000E+00 | -1.000000E+00 |
| $a_4$ | -1.503030E-01 | 4.197405E-02 | 1.466792E-01 | -8.332803E-02 | -2.680931E-01 |
| $a_6$ | 4.042909E-02 | 1.844959E-02 | -1.850968E-01 | -8.303825E-02 | 1.613032E-01 |
| $a_8$ | -4.217607E-01 | -5.595848E-01 | 1.937103E-01 | 1.274190E-01 | -8.590511E-02 |
| $a_{10}$ | 1.304509E+00 | 1.559269E+00 | -2.165987E-01 | -7.046184E-02 | 3.453596E-02 |
| $a_{12}$ | -2.043675E+00 | -2.257371E+00 | 2.958650E-01 | 2.256558E-02 | -9.917603E-03 |
| $a_{14}$ | 1.734922E+00 | 1.904361E+00 | -2.465351E-01 | -4.564639E-03 | 1.951454E-03 |
| $a_{16}$ | -7.338896E-01 | -9.258111E-01 | 1.092680E-01 | 5.773842E-04 | -2.494078E-04 |
| $a_{18}$ | 1.200437E-01 | 2.395877E-01 | -2.453855E-02 | -4.176429E-05 | 1.865895E-05 |
| $a_{20}$ | 0.000000E+00 | -2.555595E-02 | 2.216578E-03 | 1.316211E-06 | -6.187790E-07 |

FIG. 13

| EFL(Effective focus length)= 3.51mm, HFOV(Half angular field of view)= 42.09deg., System length=4.185mm, Image height= 3.17mm, Fno=2.199 ||||||||
| --- | --- | --- | --- | --- | --- | --- | --- |
| Surface # | | Radius | Thickness | Refractive index | Abbe number | Focus | Material |
| - | Object | ∞ | | | | | |
| 300 | Aperture stop | ∞ | -0.2617_TA | | | | |
| 311 | 1st lens element | 1.3332 | 0.5701_T1 | 1.546_n1 | 56.114_v1 | 3.347_f1 | plastic |
| 312 | | 4.1860 | 0.0867_G12 | | | | |
| 321 | 2nd lens element | 12.2720 | 0.2000_T2 | 1.648_n2 | 22.397_v2 | -9.545_f2 | plastic |
| 322 | | 4.0860 | 0.4049_G23 | | | | |
| 331 | 3rd lens element | 4.5443 | 0.2200_T3 | 1.648_n3 | 22.397_v3 | 192.547_f3 | plastic |
| 332 | | 4.6262 | 0.3038_G34 | | | | |
| 341 | 4th lens element | -3.8459 | 0.6046_T4 | 1.546_n4 | 56.114_v4 | 2.985_f4 | plastic |
| 342 | | -1.2083 | 0.5820_G45 | | | | |
| 351 | 5th lens element | -7.0536 | 0.3803_T5 | 1.546_n5 | 56.114_v5 | -2.390_f5 | plastic |
| 352 | | 1.6319 | 0.4635_G5F | | | | |
| 361 | IR cut filter | ∞ | 0.2100_TF | 1.518_n6 | 64.166 | | plastic |
| 362 | | ∞ | 0.1586_GFP | | | | |
| 370 | Image plane | ∞ | 0.0000 | | | | glass |

FIG. 16

| Aspherical parameters | | | | | |
|---|---|---|---|---|---|
| Surface # | 311 | 312 | 321 | 322 | 331 |
| K | 0.000000E+00 | 0.000000E+00 | 0.000000E+00 | 0.000000E+00 | 0.000000E+00 |
| $a_4$ | -8.022656E-03 | -1.242711E-01 | -1.862242E-01 | -4.520034E-02 | -1.473568E-01 |
| $a_6$ | 2.507284E-01 | 4.252821E-02 | 2.274347E-01 | 1.300968E-01 | -2.840048E-01 |
| $a_8$ | -2.074538E+00 | 1.991615E-01 | 3.048274E-01 | 1.254421E+00 | 8.353657E-01 |
| $a_{10}$ | 1.025177E+01 | -6.385572E-01 | -1.181927E+00 | -4.932956E+00 | -1.313204E+00 |
| $a_{12}$ | -2.981143E+01 | 3.299403E-01 | 7.828682E-01 | 9.658513E+00 | 1.094927E+00 |
| $a_{14}$ | 5.035399E+01 | 0.000000E+00 | 0.000000E+00 | -1.005707E+01 | -3.750426E-01 |
| $a_{16}$ | -4.556864E+01 | 0.000000E+00 | 0.000000E+00 | 4.566721E+00 | 0.000000E+00 |
| $a_{18}$ | 1.699907E+01 | 0.000000E+00 | 0.000000E+00 | 0.000000E+00 | 0.000000E+00 |
| $a_{20}$ | 0.000000E+00 | 0.000000E+00 | 0.000000E+00 | 0.000000E+00 | 0.000000E+00 |
| Surface # | 332 | 341 | 342 | 351 | 352 |
| K | 0.000000E+00 | 0.000000E+00 | -1.000000E+00 | 0.000000E+00 | -1.000000E+00 |
| $a_4$ | -8.108964E-02 | 6.358243E-02 | 1.274462E-01 | -7.778742E-02 | -2.463728E-01 |
| $a_6$ | -2.456853E-01 | -7.658472E-02 | -1.993581E-01 | -7.849798E-02 | 1.440596E-01 |
| $a_8$ | 3.576061E-01 | -2.372321E-01 | 2.966175E-01 | 1.271087E-01 | -7.231759E-02 |
| $a_{10}$ | -1.127137E-01 | 7.868167E-01 | -4.134606E-01 | -7.386027E-02 | 2.730153E-02 |
| $a_{12}$ | -3.671551E-01 | -1.084636E+00 | 4.586090E-01 | 2.473886E-02 | -7.210870E-03 |
| $a_{14}$ | 5.209739E-01 | 8.350352E-01 | -3.115742E-01 | -5.162696E-03 | 1.259732E-03 |
| $a_{16}$ | -2.567412E-01 | -3.651006E-01 | 1.201272E-01 | 6.611899E-04 | -1.369242E-04 |
| $a_{18}$ | 4.323047E-02 | 8.436704E-02 | -2.435005E-02 | -4.747583E-05 | 8.354035E-06 |
| $a_{20}$ | 0.000000E+00 | -8.002153E-03 | 2.021495E-03 | 1.458771E-06 | -2.187663E-07 |

FIG. 17

| \multicolumn{7}{|c|}{EFL(Effective focus length)= 3.51mm, HFOV(Half angular field of view)= 42.09deg., System length=4.185mm, Image height= 3.17mm, Fno=2.199} |
|---|---|---|---|---|---|---|
| Surface # | | Radius | Thickness | Refractive index | Abbe number | Focus | Material |
| - | Object | ∞ | | | | | |
| 400 | Aperture stop | ∞ | -0.2617_TA | | | | |
| 411 | 1st lens element | 1.3332 | 0.5701_T1 | 1.546_n1 | 56.114_v1 | 3.347_f1 | plastic |
| 412 | | 4.1860 | 0.0867_G12 | | | | |
| 421 | 2nd lens element | 12.2720 | 0.2000_T2 | 1.648_n2 | 22.397_v2 | -9.545_f2 | plastic |
| 422 | | 4.0860 | 0.4049_G23 | | | | |
| 431 | 3rd lens element | 4.5443 | 0.2200_T3 | 1.648_n3 | 22.397_v3 | 192.547_f3 | plastic |
| 432 | | 4.6262 | 0.3038_G34 | | | | |
| 441 | 4th lens element | -3.8459 | 0.6046_T4 | 1.546_n4 | 56.114_v4 | 2.985_f4 | plastic |
| 442 | | -1.2083 | 0.5820_G45 | | | | |
| 451 | 5th lens element | -7.0536 | 0.3803_T5 | 1.546_n5 | 56.114_v5 | -2.390_f5 | plastic |
| 452 | | 1.6319 | 0.4635_G5F | | | | |
| 461 | IR cut filter | ∞ | 0.2100_TF | 1.518_n6 | 64.166 | | plastic |
| 462 | | ∞ | 0.1586_GFP | | | | |
| 470 | Image plane | ∞ | 0.0000 | | | | glass |

FIG. 20

| Aspherical parameters | | | | | |
|---|---|---|---|---|---|
| Surface # | 411 | 412 | 421 | 422 | 431 |
| K | 0.000000E+00 | 0.000000E+00 | 0.000000E+00 | 0.000000E+00 | 0.000000E+00 |
| $a_4$ | -8.022656E-03 | -1.242711E-01 | -1.862242E-01 | -4.520034E-02 | -1.473568E-01 |
| $a_6$ | 2.507284E-01 | 4.252821E-02 | 2.274347E-01 | 1.300968E-01 | -2.840048E-01 |
| $a_8$ | -2.074538E+00 | 1.991615E-01 | 3.048274E-01 | 1.254421E+00 | 8.353657E-01 |
| $a_{10}$ | 1.025177E+01 | -6.385572E-01 | -1.181927E+00 | -4.932956E+00 | -1.313204E+00 |
| $a_{12}$ | -2.981143E+01 | 3.299403E-01 | 7.828682E-01 | 9.658513E+00 | 1.094927E+00 |
| $a_{14}$ | 5.035399E+01 | 0.000000E+00 | 0.000000E+00 | -1.005707E+01 | -3.750426E-01 |
| $a_{16}$ | -4.556864E+01 | 0.000000E+00 | 0.000000E+00 | 4.566721E+00 | 0.000000E+00 |
| $a_{18}$ | 1.699907E+01 | 0.000000E+00 | 0.000000E+00 | 0.000000E+00 | 0.000000E+00 |
| $a_{20}$ | 0.000000E+00 | 0.000000E+00 | 0.000000E+00 | 0.000000E+00 | 0.000000E+00 |
| Surface # | 432 | 441 | 442 | 451 | 452 |
| K | 0.000000E+00 | 0.000000E+00 | -1.000000E+00 | 0.000000E+00 | -1.000000E+00 |
| $a_4$ | -8.108964E-02 | 6.358243E-02 | 1.274462E-01 | -7.778742E-02 | -2.463728E-01 |
| $a_6$ | -2.456853E-01 | -7.658472E-02 | -1.993581E-01 | -7.849798E-02 | 1.440596E-01 |
| $a_8$ | 3.576061E-01 | -2.372321E-01 | 2.966175E-01 | 1.271087E-01 | -7.231759E-02 |
| $a_{10}$ | -1.127137E-01 | 7.868167E-01 | -4.134606E-01 | -7.386027E-02 | 2.730153E-02 |
| $a_{12}$ | -3.671551E-01 | -1.084636E+00 | 4.586090E-01 | 2.473886E-02 | -7.210870E-03 |
| $a_{14}$ | 5.209739E-01 | 8.350352E-01 | -3.115742E-01 | -5.162696E-03 | 1.259732E-03 |
| $a_{16}$ | -2.567412E-01 | -3.651006E-01 | 1.201272E-01 | 6.611899E-04 | -1.369242E-04 |
| $a_{18}$ | 4.323047E-02 | 8.436704E-02 | -2.435005E-02 | -4.747583E-05 | 8.354035E-06 |
| $a_{20}$ | 0.000000E+00 | -8.002153E-03 | 2.021495E-03 | 1.458771E-06 | -2.187663E-07 |

FIG. 21

EFL(Effective focus length)= 3.61mm, HFOV(Half angular field of view)= 41.31deg., System length=4.406mm, Image height= 3.17mm, Fno=2.199

| Surface # | | Radius | Thickness | Refractive index | Abbe number | Focus | Material |
|---|---|---|---|---|---|---|---|
| - | Object | ∞ | | | | | |
| 500 | Aperture stop | ∞ | -0.2857_TA | | | | |
| 511 | 1st lens element | 1.3398 | 0.4874_T1 | 1.546_n1 | 56.114_v1 | 3.344_f1 | plastic |
| 512 | | 4.3846 | 0.0850_G12 | | | | |
| 521 | 2nd lens element | 7.5195 | 0.2009_T2 | 1.648_n2 | 22.397_v2 | -8.357_f2 | plastic |
| 522 | | 3.1150 | 0.4592_G23 | | | | |
| 531 | 3rd lens element | 5.0447 | 0.2072_T3 | 1.648_n3 | 22.397_v3 | 450.970_f3 | plastic |
| 532 | | 5.0504 | 0.3625_G34 | | | | |
| 541 | 4th lens element | -4.4299 | 0.7214_T4 | 1.546_n4 | 56.114_v4 | 2.649_f4 | plastic |
| 542 | | -1.1532 | 0.3899_G45 | | | | |
| 551 | 5th lens element | -21.3668 | 0.4824_T5 | 1.546_n5 | 56.114_v5 | -2.407_f5 | plastic |
| 552 | | 1.4117 | 0.4635_G5F | | | | |
| 561 | IR cut filter | ∞ | 0.2100_TF | 1.518_n6 | 64.166 | | plastic |
| 562 | | ∞ | 0.3371_GFP | | | | |
| 570 | Image plane | ∞ | 0.0000 | | | | glass |

FIG. 24

| Aspherical parameters | | | | | |
|---|---|---|---|---|---|
| Surface # | 511 | 512 | 521 | 522 | 531 |
| K | 0.000000E+00 | 0.000000E+00 | 0.000000E+00 | 0.000000E+00 | 0.000000E+00 |
| $a_4$ | 2.586188E-03 | -1.497026E-01 | -2.278314E-01 | -6.771860E-02 | -1.448541E-01 |
| $a_6$ | 1.255842E-01 | 1.724749E-01 | 3.709141E-01 | 2.419701E-01 | -2.564233E-01 |
| $a_8$ | -8.901646E-01 | -1.199525E-01 | -1.016122E-02 | 7.286406E-01 | 7.595048E-01 |
| $a_{10}$ | 4.036425E+00 | 1.732141E-01 | -4.509081E-01 | -3.307544E+00 | -1.182908E+00 |
| $a_{12}$ | -1.055042E+01 | -2.801329E-01 | 2.061968E-01 | 6.777014E+00 | 9.473058E-01 |
| $a_{14}$ | 1.590031E+01 | 0.000000E+00 | 0.000000E+00 | -7.357184E+00 | -3.015015E-01 |
| $a_{16}$ | -1.271785E+01 | 0.000000E+00 | 0.000000E+00 | 3.495185E+00 | 0.000000E+00 |
| $a_{18}$ | 4.128753E+00 | 0.000000E+00 | 0.000000E+00 | 0.000000E+00 | 0.000000E+00 |
| $a_{20}$ | 0.000000E+00 | 0.000000E+00 | 0.000000E+00 | 0.000000E+00 | 0.000000E+00 |
| Surface # | 532 | 541 | 542 | 551 | 552 |
| K | 0.000000E+00 | 0.000000E+00 | -1.000000E+00 | 0.000000E+00 | -1.000000E+00 |
| $a_4$ | -9.347987E-02 | 2.757316E-02 | 1.446875E-01 | -4.793923E-02 | -2.559812E-01 |
| $a_6$ | -2.473446E-01 | -6.975499E-02 | -2.285054E-01 | -1.423276E-01 | 1.382182E-01 |
| $a_8$ | 5.648597E-01 | -9.274847E-02 | 2.834732E-01 | 1.997076E-01 | -6.080873E-02 |
| $a_{10}$ | -7.365486E-01 | 3.659586E-01 | -3.146310E-01 | -1.212879E-01 | 2.025353E-02 |
| $a_{12}$ | 5.857547E-01 | -4.533897E-01 | 2.947625E-01 | 4.316104E-02 | -4.799590E-03 |
| $a_{14}$ | -2.856464E-01 | 3.046172E-01 | -1.777726E-01 | -9.545520E-03 | 7.604424E-04 |
| $a_{16}$ | 9.552296E-02 | -1.173976E-01 | 6.238125E-02 | 1.291811E-03 | -7.524188E-05 |
| $a_{18}$ | -1.834234E-02 | 2.429897E-02 | -1.171987E-02 | -9.806600E-05 | 4.173449E-06 |
| $a_{20}$ | 0.000000E+00 | -2.091281E-03 | 9.176456E-04 | 3.200749E-06 | -9.895615E-08 |

FIG. 25

| | EFL(Effective focus length)= 3.61mm, HFOV(Half angular field of view)= 41.3deg., System length=4.432mm, Image height= 3.17mm, Fno=2.19 |
|---|---|---|---|---|---|---|---|
| Surface # | | Radius | Thickness | Refractive index | Abbe number | Focus | Material |
| - | Object | ∞ | | | | | |
| 600 | Aperture stop | ∞ | -0.2837_TA | | | | |
| 611 | 1st lens element | 1.3488 | 0.4810_T1 | 1.546_n1 | 56.114_v1 | 3.293_f1 | plastic |
| 612 | | 4.7178 | 0.0873_G12 | | | | |
| 621 | 2nd lens element | 7.3569 | 0.2000_T2 | 1.648_n2 | 22.397_v2 | -7.935_f2 | plastic |
| 622 | | 2.9941 | 0.4687_G23 | | | | |
| 631 | 3rd lens element | 5.5003 | 0.2266_T3 | 1.648_n3 | 22.397_v3 | -947.832_f3 | plastic |
| 632 | | 5.3632 | 0.3602_G34 | | | | |
| 641 | 4th lens element | -4.6277 | 0.7167_T4 | 1.546_n4 | 56.114_v4 | 2.598_f4 | plastic |
| 642 | | -1.1451 | 0.3582_G45 | | | | |
| 651 | 5th lens element | -20.7051 | 0.5211_T5 | 1.546_n5 | 56.114_v5 | -2.380_f5 | plastic |
| 652 | | 1.3989 | 0.4635_G5F | | | | |
| 661 | IR cut filter | ∞ | 0.2100_TF | 1.518_n6 | 64.166 | | plastic |
| 662 | | ∞ | 0.3387_GFP | | | | |
| 670 | Image plane | ∞ | 0.0000 | | | | glass |

FIG. 28

| Aspherical parameters | | | | | |
|---|---|---|---|---|---|
| Surface # | 611 | 612 | 621 | 622 | 631 |
| K | 0.000000E+00 | 0.000000E+00 | 0.000000E+00 | 0.000000E+00 | 0.000000E+00 |
| $a_4$ | 1.127899E-02 | -1.470893E-01 | -2.349990E-01 | -8.210860E-02 | -1.550301E-01 |
| $a_6$ | -2.257298E-03 | 1.905176E-01 | 4.133686E-01 | 3.194307E-01 | -1.934945E-01 |
| $a_8$ | 1.175548E-01 | -1.643780E-01 | -1.196916E-01 | 3.185741E-01 | 5.977931E-01 |
| $a_{10}$ | -3.563720E-01 | 2.176926E-01 | -3.008744E-01 | -1.961929E+00 | -9.197710E-01 |
| $a_{12}$ | 5.559370E-01 | -2.761097E-01 | 1.410499E-01 | 4.204673E+00 | 7.269773E-01 |
| $a_{14}$ | -3.336269E-01 | 0.000000E+00 | 0.000000E+00 | -4.698238E+00 | -2.258352E-01 |
| $a_{16}$ | 0.000000E+00 | 0.000000E+00 | 0.000000E+00 | 2.335250E+00 | 0.000000E+00 |
| $a_{18}$ | 0.000000E+00 | 0.000000E+00 | 0.000000E+00 | 0.000000E+00 | 0.000000E+00 |
| $a_{20}$ | 0.000000E+00 | 0.000000E+00 | 0.000000E+00 | 0.000000E+00 | 0.000000E+00 |
| Surface # | 632 | 641 | 642 | 651 | 652 |
| K | 0.000000E+00 | 0.000000E+00 | -1.000000E+00 | 0.000000E+00 | -1.000000E+00 |
| $a_4$ | -9.691338E-02 | 3.438200E-02 | 1.614401E-01 | -3.401184E-02 | -2.535039E-01 |
| $a_6$ | -2.450861E-01 | -1.035991E-01 | -2.899648E-01 | -1.874627E-01 | 1.307368E-01 |
| $a_8$ | 6.489800E-01 | -9.978830E-03 | 4.054897E-01 | 2.559977E-01 | -5.395752E-02 |
| $a_{10}$ | -1.018149E+00 | 2.201757E-01 | -4.789891E-01 | -1.599753E-01 | 1.675340E-02 |
| $a_{12}$ | 1.048955E+00 | -2.752330E-01 | 4.412919E-01 | 5.907640E-02 | -3.709173E-03 |
| $a_{14}$ | -6.917930E-01 | 1.733418E-01 | -2.602566E-01 | -1.356851E-02 | 5.465400E-04 |
| $a_{16}$ | 2.722554E-01 | -6.329567E-02 | 9.053239E-02 | 1.905715E-03 | -4.958759E-05 |
| $a_{18}$ | -4.812130E-02 | 1.284283E-02 | -1.706132E-02 | -1.500657E-04 | 2.468811E-06 |
| $a_{20}$ | 0.000000E+00 | -1.120660E-03 | 1.351450E-03 | 5.080279E-06 | -5.118817E-08 |

FIG. 29

| EFL(Effective focus length)= 3.61mm, HFOV(Half angular field of view)= 41.30deg., System length=4.414mm, Image height= 3.17mm, Fno=2.199 ||||||||
|---|---|---|---|---|---|---|---|
| Surface # | | Radius | Thickness | Refractive index | Abbe number | Focus | Material |
| - | Object | ∞ | | | | | |
| 700 | Aperture stop | ∞ | -0.2816_TA | | | | |
| 711 | 1st lens element | 1.3551 | 0.4742_T1 | 1.546_n1 | 56.114_v1 | 3.180_f1 | plastic |
| 712 | | 5.4122 | 0.0782_G12 | | | | |
| 721 | 2nd lens element | 7.0720 | 0.2248_T2 | 1.648_n2 | 22.397_v2 | -6.920_f2 | plastic |
| 722 | | 2.7100 | 0.4424_G23 | | | | |
| 731 | 3rd lens element | 5.2181 | 0.2233_T3 | 1.648_n3 | 22.397_v3 | 385.401_f3 | plastic |
| 732 | | 5.2398 | 0.4061_G34 | | | | |
| 741 | 4th lens element | -5.2560 | 0.7066_T4 | 1.546_n4 | 56.114_v4 | 2.584_f4 | plastic |
| 742 | | -1.1652 | 0.3551_G45 | | | | |
| 751 | 5th lens element | -21.4008 | 0.4983_T5 | 1.546_n5 | 56.114_v5 | -2.358_f5 | plastic |
| 752 | | 1.3809 | 0.4635_G5F | | | | |
| 761 | IR cut filter | ∞ | 0.2100_TF | 1.518_n6 | 64.166 | | plastic |
| 762 | | ∞ | 0.3319_GFP | | | | |
| 770 | Image plane | ∞ | 0.0000 | | | | glass |

FIG. 32

| Aspherical parameters | | | | | |
|---|---|---|---|---|---|
| Surface # | 711 | 712 | 721 | 722 | 731 |
| K | 0.000000E+00 | 0.000000E+00 | 0.000000E+00 | 0.000000E+00 | 0.000000E+00 |
| $a_4$ | 1.237444E-02 | -1.688833E-01 | -2.546836E-01 | -9.154685E-02 | -1.644530E-01 |
| $a_6$ | -2.344652E-02 | 2.952517E-01 | 5.319823E-01 | 3.650716E-01 | -1.586752E-01 |
| $a_8$ | 2.153241E-01 | -3.211214E-01 | -4.083064E-01 | 1.141490E-01 | 5.179381E-01 |
| $a_{10}$ | -5.815032E-01 | 3.321022E-01 | 2.903952E-02 | -1.579567E+00 | -7.985029E-01 |
| $a_{12}$ | 8.054504E-01 | -2.986634E-01 | 0.000000E+00 | 3.710109E+00 | 6.389992E-01 |
| $a_{14}$ | -4.387800E-01 | 0.000000E+00 | 0.000000E+00 | -4.193556E+00 | -2.034825E-01 |
| $a_{16}$ | 0.000000E+00 | 0.000000E+00 | 0.000000E+00 | 2.059745E+00 | 0.000000E+00 |
| $a_{18}$ | 0.000000E+00 | 0.000000E+00 | 0.000000E+00 | 0.000000E+00 | 0.000000E+00 |
| $a_{20}$ | 0.000000E+00 | 0.000000E+00 | 0.000000E+00 | 0.000000E+00 | 0.000000E+00 |
| Surface # | 732 | 741 | 742 | 751 | 752 |
| K | 0.000000E+00 | 0.000000E+00 | -1.000000E+00 | 0.000000E+00 | -1.000000E+00 |
| $a_4$ | -1.030985E-01 | 3.517444E-02 | 1.777998E-01 | -2.601958E-02 | -2.554860E-01 |
| $a_6$ | -2.380834E-01 | -9.436607E-02 | -3.325974E-01 | -2.226451E-01 | 1.233863E-01 |
| $a_8$ | 7.082963E-01 | -2.767752E-02 | 5.003371E-01 | 2.907633E-01 | -4.584848E-02 |
| $a_{10}$ | -1.245506E+00 | 2.344606E-01 | -6.325924E-01 | -1.753308E-01 | 1.238140E-02 |
| $a_{12}$ | 1.448012E+00 | -2.747760E-01 | 6.016320E-01 | 6.219159E-02 | -2.283395E-03 |
| $a_{14}$ | -1.062534E+00 | 1.658566E-01 | -3.608755E-01 | -1.367912E-02 | 2.557803E-04 |
| $a_{16}$ | 4.480565E-01 | -5.971374E-02 | 1.268061E-01 | 1.837830E-03 | -1.382466E-05 |
| $a_{18}$ | -8.185284E-02 | 1.236794E-02 | -2.396653E-02 | -1.384143E-04 | 6.751768E-08 |
| $a_{20}$ | 0.000000E+00 | -1.129677E-03 | 1.888610E-03 | 4.452359E-06 | 1.595079E-08 |

FIG. 33

| \multicolumn{7}{c|}{EFL(Effective focus length)= 3.618mm, HFOV(Half angular field of view)= 41.21deg., System length=4.236mm, Image height= 3.17mm, Fno=2.199} |
|---|---|---|---|---|---|---|
| Surface # | | Radius | Thickness | Refractive index | Abbe number | Focus | Material |
| - | Object | ∞ | | | | | |
| 800 | Aperture stop | ∞ | -0.2737_TA | | | | |
| 811 | 1st lens element | 1.3396 | 0.6498_T1 | 1.546_n1 | 56.114_v1 | 3.198_f1 | plastic |
| 812 | | 4.7707 | 0.0855_G12 | | | | |
| 821 | 2nd lens element | 19.3273 | 0.2005_T2 | 1.648_n2 | 22.397_v2 | -8.193_f2 | plastic |
| 822 | | 4.1479 | 0.3434_G23 | | | | |
| 831 | 3rd lens element | 4.3356 | 0.2374_T3 | 1.648_n3 | 22.397_v3 | 144.442_f3 | plastic |
| 832 | | 4.4483 | 0.2844_G34 | | | | |
| 841 | 4th lens element | -3.3273 | 0.5659_T4 | 1.546_n4 | 56.114_v4 | 2.970_f4 | plastic |
| 842 | | -1.1559 | 0.4238_G45 | | | | |
| 851 | 5th lens element | -9.1166 | 0.4398_T5 | 1.546_n5 | 56.114_v5 | -2.525_f5 | plastic |
| 852 | | 1.6521 | 0.4635_G5F | | | | |
| 861 | IR cut filter | ∞ | 0.2100_TF | 1.518_n6 | 64.166 | | plastic |
| 862 | | ∞ | 0.3319_GFP | | | | |
| 870 | Image plane | ∞ | 0.0000 | | | | glass |

FIG. 36

| Aspherical parameters | | | | | |
|---|---|---|---|---|---|
| Surface # | 811 | 812 | 821 | 822 | 831 |
| K | 0.000000E+00 | 0.000000E+00 | 0.000000E+00 | 0.000000E+00 | 0.000000E+00 |
| $a_4$ | -5.482745E-03 | -1.311116E-01 | -1.977444E-01 | -6.413479E-02 | -2.240184E-01 |
| $a_6$ | 9.398711E-02 | 2.579392E-02 | 2.387000E-01 | 1.363398E-01 | 9.441776E-02 |
| $a_8$ | -3.731701E-01 | 5.953630E-01 | 7.843126E-01 | 1.639705E+00 | -4.370849E-01 |
| $a_{10}$ | 8.048904E-01 | -2.162763E+00 | -3.283232E+00 | -6.650487E+00 | 1.593004E+00 |
| $a_{12}$ | -8.223151E-01 | 2.679001E+00 | 4.141744E+00 | 1.266638E+01 | -2.912235E+00 |
| $a_{14}$ | 2.983141E-01 | -1.277085E+00 | -1.883227E+00 | -1.239479E+01 | 2.606001E+00 |
| $a_{16}$ | 0.000000E+00 | 0.000000E+00 | 0.000000E+00 | 5.162497E+00 | -9.289680E-01 |
| $a_{18}$ | 0.000000E+00 | 0.000000E+00 | 0.000000E+00 | 0.000000E+00 | 0.000000E+00 |
| $a_{20}$ | 0.000000E+00 | 0.000000E+00 | 0.000000E+00 | 0.000000E+00 | 0.000000E+00 |
| Surface # | 832 | 841 | 842 | 851 | 852 |
| K | 0.000000E+00 | 0.000000E+00 | -1.000000E+00 | 0.000000E+00 | -1.000000E+00 |
| $a_4$ | -1.523252E-01 | 4.272807E-02 | 1.365916E-01 | -8.108642E-02 | -2.670322E-01 |
| $a_6$ | 4.004402E-02 | 7.586346E-02 | -9.930654E-02 | -8.067782E-02 | 1.616269E-01 |
| $a_8$ | -4.515260E-01 | -8.497659E-01 | -5.105552E-02 | 1.214887E-01 | -8.653540E-02 |
| $a_{10}$ | 1.457547E+00 | 2.182517E+00 | 1.614648E-01 | -6.566175E-02 | 3.503731E-02 |
| $a_{12}$ | -2.306781E+00 | -2.991769E+00 | -5.334258E-02 | 2.043275E-02 | -1.020812E-02 |
| $a_{14}$ | 1.953396E+00 | 2.416213E+00 | -4.720631E-02 | -3.989444E-03 | 2.055407E-03 |
| $a_{16}$ | -8.211119E-01 | -1.137000E+00 | 4.005953E-02 | 4.836505E-04 | -2.706884E-04 |
| $a_{18}$ | 1.335305E-01 | 2.874318E-01 | -1.110818E-02 | -3.328046E-05 | 2.093627E-05 |
| $a_{20}$ | 0.000000E+00 | -3.015827E-02 | 1.098421E-03 | 9.902329E-07 | -7.165961E-07 |

FIG. 37

| Embodiment | 1st | 2nd | 3rd | 4th | 5th | 6th | 7th | 8th |
|---|---|---|---|---|---|---|---|---|
| TTL | 4.204 | 4.226 | 4.185 | 4.185 | 4.406 | 4.432 | 4.414 | 4.235 |
| ALT | 2.032 | 2.062 | 1.975 | 1.975 | 2.099 | 2.145 | 2.127 | 2.093 |
| Gaa | 1.153 | 1.167 | 1.377 | 1.377 | 1.297 | 1.274 | 1.282 | 1.137 |
| BFL | 0.555 | 0.533 | 0.369 | 0.369 | 0.547 | 0.549 | 0.542 | 0.542 |
| ALT/G45 | 4.692 | 4.783 | 3.394 | 3.394 | 5.383 | 5.990 | 5.990 | 4.939 |
| ALT/T1 | 3.235 | 3.342 | 3.464 | 3.464 | 4.307 | 4.460 | 4.486 | 3.222 |
| ALT/T5 | 4.784 | 4.775 | 5.194 | 5.194 | 4.352 | 4.117 | 4.269 | 4.760 |
| G45/T5 | 1.020 | 0.998 | 1.530 | 1.530 | 0.808 | 0.687 | 0.713 | 0.964 |
| T4/G23 | 1.571 | 1.553 | 1.493 | 1.493 | 1.571 | 1.529 | 1.597 | 1.648 |
| T4/G34 | 1.990 | 1.990 | 1.990 | 1.990 | 1.990 | 1.990 | 1.740 | 1.990 |
| T4/T1 | 0.888 | 0.922 | 1.061 | 1.061 | 1.480 | 1.490 | 1.490 | 0.871 |
| T4/T5 | 1.313 | 1.317 | 1.590 | 1.590 | 1.496 | 1.375 | 1.418 | 1.287 |
| T5/T1 | 0.676 | 0.700 | 0.667 | 0.667 | 0.990 | 1.083 | 1.051 | 0.677 |
| ALT/T4 | 3.644 | 3.625 | 3.266 | 3.266 | 2.910 | 2.993 | 3.011 | 3.699 |
| G34/T2 | 1.401 | 1.330 | 1.519 | 1.519 | 1.804 | 1.801 | 1.807 | 1.419 |
| G34/T3 | 1.265 | 1.244 | 1.381 | 1.381 | 1.750 | 1.590 | 1.818 | 1.198 |
| G34/T4 | 0.503 | 0.503 | 0.503 | 0.503 | 0.503 | 0.503 | 0.575 | 0.503 |
| Gaa/T1 | 1.836 | 1.892 | 2.416 | 2.416 | 2.660 | 2.649 | 2.703 | 1.750 |
| Gaa/T2 | 5.767 | 5.432 | 6.887 | 6.887 | 6.455 | 6.372 | 5.703 | 5.672 |
| T5/T2 | 2.124 | 2.010 | 1.901 | 1.901 | 2.401 | 2.605 | 2.217 | 2.194 |
| G45/T2 | 2.166 | 2.006 | 2.910 | 2.910 | 1.941 | 1.791 | 1.580 | 2.114 |
| G45/T3 | 1.955 | 1.877 | 2.646 | 2.646 | 1.882 | 1.581 | 1.590 | 1.785 |

FIG. 38

MOBILE DEVICE AND OPTICAL IMAGING LENS THEREOF

INCORPORATION BY REFERENCE

This application claims priority from R.O.C. Patent Application No. 104105136, filed on Feb. 13, 2015, the contents of which are hereby incorporated by reference in their entirety for all purposes.

TECHNICAL FIELD

The present disclosure relates to mobile devices and optical imaging lens thereof. More specifically, the present disclosure relates to mobile devices applying optical imaging lens having six lens elements and an optical imaging lens thereof.

BACKGROUND

The ever-increasing demand for smaller sized mobile devices has triggered a corresponding and growing need for smaller sized photography modules comprising elements such as an optical imaging lens, a module housing unit, and an image sensor, etc., contained therein. Size reductions may be contributed from various aspects of the mobile devices, which may include not only the charge coupled device (CCD) and the complementary metal-oxide semiconductor (CMOS), but also the optical imaging lens mounted therein. When reducing the size of the optical imaging lens, however, achieving good optical characteristics may become a challenging problem when dealing with practical issues, such as nature of the material used in the optical imaging lens, yield of manufacturing process, etc.

Therefore, to manufacturing a optical imaging lens requires more intensive technology than traditional camera lens, and there is a need to develop optical imaging lens having the capability of placing six lens elements therein, having a shorter length, while also having good optical characteristics.

SUMMARY

In some embodiments, the present disclosure provides for a camera device and an optical imaging lens thereof. By controlling the convex or concave shape of the surfaces and designing various parameters to satisfying at least one inequality, the length of the optical imaging lens may be shortened while maintaining good optical characteristics and system functionality.

In some embodiments, an optical imaging lens may comprise, sequentially from an object side to an image side along an optical axis, a first lens element, an aperture stop, a second lens element, a third lens element, a fourth lens element, and a fifth lens element. Each of the first, second, third, fourth, and fifth lens elements may have refractive power, an object-side surface facing toward the object side, an image-side surface facing toward the image side, and a central thickness defined along the optical axis.

In the specification, parameters used here are: the central thickness of the first lens element, represented by T1, an air gap between the first lens element and the second lens element along the optical axis, represented by G12, the central thickness of the second lens element, represented by T2, an air gap between the second lens element and the third lens element along the optical axis, represented by G23, the central thickness of the third lens element, represented by T3, an air gap between the third lens element and the fourth lens element along the optical axis, represented by G34, the central thickness of the fourth lens element, represented by T4, an air gap between the fourth lens element and the fifth lens element along the optical axis, represented by G45, the central thickness of the fifth lens element, represented by T5, a distance between the image-side surface of the fifth lens element and the object-side surface of a filtering unit along the optical axis, represented by G5F, the central thickness of the filtering unit along the optical axis, represented by TF, a distance between the image-side surface of the filtering unit and an image plane along the optical axis, represented by GFP, a focusing length of the first lens element, represented by f1, a focusing length of the second lens element, represented by f2, a focusing length of the third lens element, represented by f3, a focusing length of the fourth lens element, represented by f4, a focusing length of the fifth lens element, represented by f5, the refractive index of the first lens element, represented by n1, the refractive index of the second lens element, represented by n2, the refractive index of the third lens element, represented by n3, the refractive index of the fourth lens element, represented by n4, the refractive index of the fifth lens element, represented by n5, an abbe number of the first lens element, represented by v1, an abbe number of the second lens element, represented by v2, an abbe number of the third lens element, represented by v3, an abbe number of the fourth lens element, represented by v4, an abbe number of the fifth lens element, represented by v5, an effective focal length of the optical imaging lens, represented by EFL, the length between the object-side surface of the first lens element and the image plane along the optical axis, represented by TTL, a sum of the central thicknesses of all six lens elements, comprising T1, T2, T3 T4, and T5, represented by ALT, a sum of all five air gaps from the first lens element to the sixth lens element along the optical axis, represented by Gaa (that is G12+G23+G34+G45), and a back focal length of the optical imaging lens, which is defined as the distance from the image-side surface of the fifth lens element to the image plane along the optical axis comprising G5F, TF and GFP and represented by BFL.

In some embodiments, the image-side surface of the first lens element may comprise a concave portion in a vicinity of the optical axis; the image-side surface of the second lens element may comprise a concave portion in a vicinity of the optical axis; the object-side surface of the third lens element may comprise a convex portion in a vicinity of the optical axis and a concave portion in a vicinity of a periphery of the third lens element; the object-side surface of the fourth lens element may comprise a concave portion in a vicinity of the optical axis; the object-side surface of the fifth lens element may comprise a concave portion in a vicinity of the optical axis. In some embodiments, the optical imaging lens may comprise no other lenses having refracting power beyond the five lens elements.

In this present disclosure, the parameters described above could be controlled to satisfy some equations as follows:

$$ALT/G45 \leq 6.0 \qquad \text{Equation (1); or}$$

$$ALT/T1 \leq 4.5 \qquad \text{Equation (2); or}$$

$$ALT/T4 \geq 2.9 \qquad \text{Equation (3); or}$$

$$T4/T1 \leq 1.5 \qquad \text{Equation (4); or}$$

$$T4/T5 \leq 1.6 \qquad \text{Equation (5); or}$$

$$Gaa/T1 \geq 1.55 \qquad \text{Equation (6); or}$$

$1.5 \leq G45/T2 \leq 3.0$ Equation (7); or $G34/T2 \geq 1.3$ Equation (8); or $G34/T4 \geq 0.5$ Equation (9); or $T4/G34 \leq 2.0$ Equation (10); or $ALT/T5 \leq 6.02$ Equation (11); or $T5/T1 \leq 1.1$ Equation (12); or $T5/T2 \geq 1.4$ Equation (13); or $T4/G23 \leq 1.87$ Equation (14); or $G45/T5 \leq 3.0$ Equation (15); or $Gaa/T2 \geq 4.5$ Equation (16); or $1.2 \leq G45/T3 \leq 2.8$ Equation (17); or $G34/T3 \geq 1.0$ Equation (18).

Aforesaid exemplary embodiments are not limited and could be selectively incorporated in other embodiments described herein.

In some embodiments, more details about the convex or concave surface structure, refractive power could be incorporated for one specific lens element or broadly for plural lens elements to enhance the control for the system performance and/or resolution. It is noted that the details listed here could be incorporated in example embodiments if no inconsistency occurs.

In some embodiments, a mobile device comprising a housing and a photography module positioned in the housing may be provided. The photography module may comprise any of aforesaid example embodiments of optical imaging lens, a lens barrel, a module housing unit, a substrate and an image sensor. The lens barrel may be suitable for positioning the optical imaging lens, the module housing unit may be suitable for positioning the lens barrel, the substrate may be suitable for positioning the module housing unit, and the image sensor may be suitable positioned at the image side of the optical imaging lens.

Through controlling the convex or concave shape of the surfaces and/or the refraction power of the lens element(s), the camera device and the optical imaging lens thereof in exemplary embodiments may achieve good optical characteristics and may effectively reduce the length of the optical imaging lens.

BRIEF DESCRIPTION OF THE DRAWINGS

Exemplary embodiments will be more readily understood from the following detailed description when read in conjunction with the appended drawing, in which:

FIG. 1 is a cross-sectional view of one single lens element according to the present disclosure;

FIG. 2 is a schematic view of the relation between the surface shape and the optical focus of the lens element;

FIG. 8 is a table of optical data for each lens element of a first embodiment of an optical imaging lens according to the present disclosure;

FIG. 9 is a table of aspherical data of a first embodiment of the optical imaging lens according to the present disclosure;

FIG. 12 is a table of optical data for each lens element of the optical imaging lens of a second embodiment of the present disclosure;

FIG. 13 is a table of aspherical data of a second embodiment of the optical imaging lens according to the present disclosure;

FIG. 16 is a table of optical data for each lens element of the optical imaging lens of a third embodiment of the present disclosure;

FIG. 17 is a table of aspherical data of a third embodiment of the optical imaging lens according to the present disclosure;

FIG. 20 is a table of optical data for each lens element of the optical imaging lens of a fourth embodiment of the present disclosure;

FIG. 21 is a table of aspherical data of a fourth embodiment of the optical imaging lens according to the present disclosure;

FIG. 24 is a table of optical data for each lens element of the optical imaging lens of a fifth embodiment of the present disclosure;

FIG. 25 is a table of aspherical data of a fifth embodiment of the optical imaging lens according to the present disclosure;

FIG. 28 is a table of optical data for each lens element of the optical imaging lens of a sixth embodiment of the present disclosure;

FIG. 29 is a table of aspherical data of a sixth embodiment of the optical imaging lens according to the present disclosure;

FIG. 32 is a table of optical data for each lens element of the optical imaging lens of a seventh embodiment of the present disclosure;

FIG. 33 is a table of aspherical data of a seventh embodiment of the optical imaging lens according to the present disclosure;

FIG. 36 is a table of optical data for each lens element of the optical imaging lens of an eighth embodiment of the present disclosure;

FIG. 37 is a table of aspherical data of an eighth embodiment of the optical imaging lens according to the present disclosure;

FIG. 38 is a table for the values of TTL, ALT, Gaa, BFL, ALT/G45, ALT/T1, ALT/T5, G45/T5, T4/G23, T4/G34, T4/T1, T4/T5, T5/T1, ALT/T4, G34/T2, G34/T3, G34/T4, Gaa/T1, Gaa/T2, T5/T2, G45/T2, and G45/T3 of all eight example embodiments;

DETAILED DESCRIPTION

Figure 3:
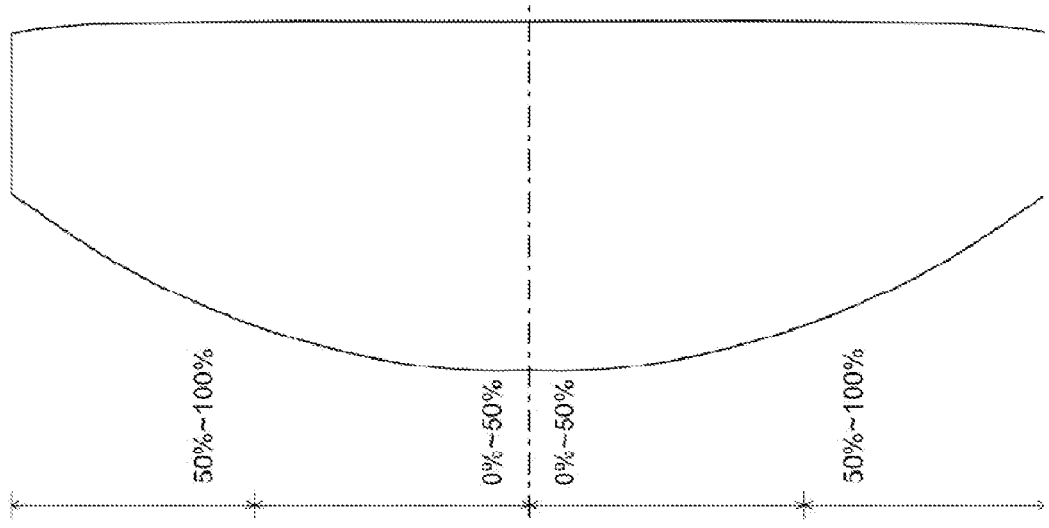
FIG. 3 is a schematic view of a first example of the surface shape and the efficient radius of the lens element.

For a more complete understanding of the present disclosure and its advantages, reference is now made to the following description taken in conjunction with the accompanying drawings, in which like reference numbers indicate like features. Persons having ordinary skill in the art will understand other varieties for implementing example embodiments, including those described herein. The drawings are not limited to specific scale and similar reference numbers are used for representing similar elements. As used in the disclosures and the appended claims, the terms "example embodiment," "exemplary embodiment," and "present embodiment" do not necessarily refer to a single embodiment, although it may, and various example embodiments may be readily combined and interchanged, without departing from the scope or spirit of the present disclosure. Furthermore, the terminology as used herein is for the purpose of describing example embodiments only and is not intended to be a limitation of the disclosure. In this respect, as used herein, the term "in" may include "in" and "on", and the terms "a", "an" and "the" may include singular and plural references. Furthermore, as used herein, the term "by" may also mean "from", depending on the context. Furthermore, as used herein, the term "if" may also mean "when" or "upon", depending on the context. Furthermore, as used herein, the words "and/or" may refer to and encompass any and all possible combinations of one or more of the associated listed items.

In the present specification, the description "a lens element having positive refracting power (or negative refracting power)" may indicate that the paraxial refracting power of the lens element in Gaussian optics is positive (or negative). The description "An object-side (or image-side) surface of a lens element" may only include a specific region of that surface of the lens element where imaging rays are capable of passing through that region, namely the clear aperture of the surface. The aforementioned imaging rays can be classified into two types, chief ray Lc and marginal ray Lm. Taking a lens element depicted in FIG. 1 as an example, the lens element may be rotationally symmetric, where the optical axis I is the axis of symmetry. The region A of the lens element may be defined as "a portion in a vicinity of the optical axis", and the region C of the lens element may be defined as "a portion in a vicinity of a periphery of the lens element". Besides, the lens element may also have an extending portion E extended radially and outwardly from the region C, namely the portion outside of the clear aperture of the lens element. The extending portion E may usually be used for physically assembling the lens element into an optical imaging lens system. Under normal circumstances, the imaging rays would not pass through the extending portion E because those imaging rays only pass through the clear aperture. The structures and shapes of the aforementioned extending portion E are only examples for technical explanation, the structures and shapes of lens elements should not be limited to these examples. Note that the extending portions of the lens element surfaces depicted in the following embodiments are partially omitted.

The following criteria are provided for determining the shapes and the portions of lens element surfaces set forth in the present specification. These criteria may be suitable for determining the boundaries of portions under various circumstances including the portion in a vicinity of the optical axis, the portion in a vicinity of a periphery of a lens element surface, and other types of lens element surfaces such as those having multiple portions.

FIG. 1 is a radial cross-sectional view of a lens element. Before determining boundaries of those aforesaid portions, two referential points should be explained first, central point and transition point. The central point of a surface of a lens element may be a point of intersection of that surface and the optical axis. The transition point may be a point on a surface of a lens element, where the tangent line of that point is perpendicular to the optical axis. Additionally, if multiple transition points appear on one single surface, then these transition points may be sequentially named along the radial direction of the surface with numbers starting from the first transition point. For instance, the first transition point (closest one to the optical axis), the second transition point, and the Nth transition point (farthest one to the optical axis within the scope of the clear aperture of the surface). The portion of a surface of the lens element between the central point and the first transition point may be the portion in a vicinity of the optical axis. The portion located radially outside of the Nth transition point (but still within the scope of the clear aperture) may be the portion in a vicinity of a periphery of the lens element. In some embodiments, there may be other portions existing or disposed between the portion in a vicinity of the optical axis and the portion in a vicinity of a periphery of the lens element; the numbers of portions depend on the numbers of the transition point(s). In addition, the radius of the clear aperture (or a so-called effective radius) of a surface may be the radial distance from the optical axis I to a point of intersection of the marginal ray Lm and the surface of the lens element.

Referring to FIG. 2, determining the shape of a portion is convex or concave may depend on whether a collimated ray passing through that portion converges or diverges. That is, while applying a collimated ray to a portion to be determined in terms of shape, the collimated ray passing through that portion may be bent and the ray itself or its extension line may eventually meet the optical axis. The shape of that portion can be determined by whether the ray or its extension line meets (intersects) the optical axis (focal point) at the object-side or image-side. For instance, if the ray itself intersects the optical axis at the image side of the lens element after passing through a portion, i.e. the focal point of this ray may be at the image side (see point R in FIG. 2), the portion may be determined as having a convex shape. On the contrary, if the ray diverges after passing through a portion, the extension line of the ray intersects the optical axis at the object side of the lens element, i.e. the focal point of the ray is at the object side (see point M in FIG. 2), that portion may be determined as having a concave shape. Therefore, referring to FIG. 2, the portion between the central point and the first transition point has a convex shape, the portion located radially outside of the first transition point may have a concave shape, and the first transition point may be the point where the portion having a convex shape changes to the portion having a concave shape, namely the border of two adjacent portions. Alternatively, there is another way to tell whether a portion in a vicinity of the optical axis has a convex or concave shape by referring to the sign of an "R" value, which is the (paraxial) radius of curvature of a lens surface. The R value which is commonly used in conventional optical design software such as Zemax and CodeV. The R value usually appears in the lens data sheet in the software. For an object-side surface, positive R may mean that the object-side surface is convex, and negative R may mean that the object-side surface is concave. Conversely, for an image-side surface, positive R may mean that the image-side surface is concave, and negative R may mean that the image-side surface is convex. The result found by using this method should be consistent as by using the other way mentioned above, which may determine surface shapes by referring to whether the focal point of a collimated ray is at the object side or the image side.

For none transition point cases, the portion in a vicinity of the optical axis may be defined as the portion between 0~50% of the effective radius (radius of the clear aperture) of the surface, whereas the portion in a vicinity of a periphery of the lens element may be defined as the portion between 50~100% of effective radius (radius of the clear aperture) of the surface.

Referring to the first example depicted in FIG. 3, only one transition point, namely a first transition point, may appear within the clear aperture of the image-side surface of the lens element. Portion I may be a portion in a vicinity of the optical axis, and portion II may be a portion in a vicinity of a periphery of the lens element. The portion in a vicinity of the optical axis may be determined as having a concave surface due to the R value at the image-side surface of the lens element is positive. The shape of the portion in a vicinity of a periphery of the lens element may be different from that of the radially inner adjacent portion, i.e. the shape of the portion in a vicinity of a periphery of the lens element may be different from the shape of the portion in a vicinity of the optical axis; the portion in a vicinity of a periphery of the lens element has a convex shape.

Figure 4:
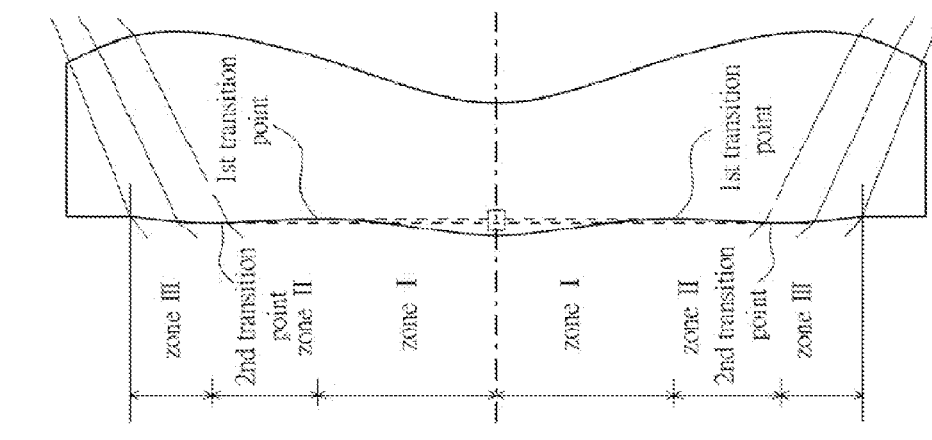
FIG. 4 is a schematic view of a second example of the surface shape and the efficient radius of the lens element.

Referring to the second example depicted in FIG. 4, a first transition point and a second transition point may exist on the object-side surface (within the clear aperture) of a lens element. In which portion I is the portion in a vicinity of the optical axis, and portion III is the portion in a vicinity of a periphery of the lens element. The portion in a vicinity of the optical axis may have a convex shape because the R value at the object-side surface of the lens element may be positive. The portion in a vicinity of a periphery of the lens element (portion III) may have a convex shape. What is more, there may be another portion having a concave shape existing between the first and second transition point (portion II).

Figure 5:
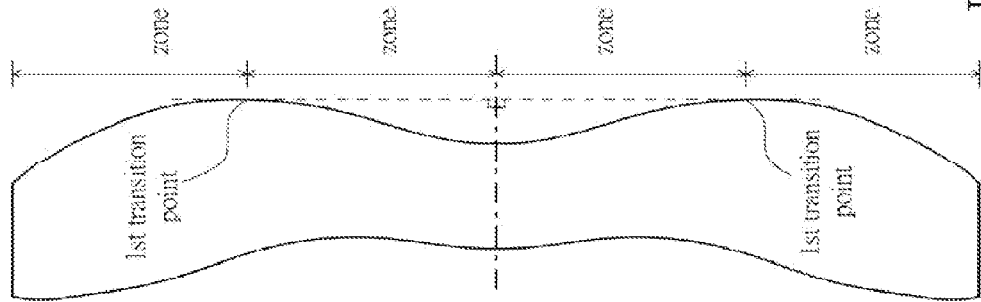
FIG. 5 is a schematic view of a third example of the surface shape and the efficient radius of the lens element.

Referring to a third example depicted in FIG. 5, no transition point may exist on the object-side surface of the lens element. In such cases, the portion between 0~50% of the effective radius (radius of the clear aperture) may be determined as the portion in a vicinity of the optical axis, and the portion between 50~100% of the effective radius may be determined as the portion in a vicinity of a periphery of the lens element. The portion in a vicinity of the optical axis of the object-side surface of the lens element may be determined as having a convex shape due to its positive R value, and the portion in a vicinity of a periphery of the lens element may be determined as having a convex shape as well.

In the present disclosure, examples of an optical imaging lens which is a prime lens are provided. Example embodiments of an optical imaging lens may comprise an aperture stop, a first lens element, a second lens element, a third lens element, a fourth lens element, and a fifth lens element, each of the lens elements comprises refractive power, an object-side surface facing toward an object side and an image-side surface facing toward an image side. These lens elements may be arranged sequentially from the object side to the image side along an optical axis, and example embodiments of the lens as a whole may comprise only the five lens elements having refractive power. Through controlling the convex or concave shape of the surfaces and/or the refraction power of the lens element(s), the camera device and the optical imaging lens thereof in exemplary embodiments may achieve good optical characteristics and may effectively shorten the length of the optical imaging lens.

When the optical imaging lens of the present disclosure satisfy at least one condition listed as follows, the overall size of the optical imaging lens may be further reduced: ALT/G45≤6.0; ALT/T1≤4.5; ALT/T5≤6.02; G45/T5≤3.0; T4/G23≤1.87; T4/G34≤2.0; T4/T1≤1.5; T4/T5≤1.6; T5/T1≤1.1; G45/T2≤3.0; and G45/T3≤2.8. When the optical imaging lens of the present disclosure further satisfy at least one condition listed as follows, the optical characters of the optical imaging lens may be further promoted: 3.0≤ALT/G45≤6.0; 2.32≤ALT/T1≤4.5; 3.24≤ALT/T5≤6.02; 0.6≤G45/T5≤3.0; 1.01≤T4/G23≤1.87; 1.01≤T4/G34≤2.0; 0.6≤T4/T1≤1.5; 0.83≤T4/T5≤1.6; 0.5≤T5/T1≤1.1; 1.5≤G45/T2≤3.0; and 1.2≤G45/T3≤2.8.

When the optical imaging lens of the present disclosure satisfy at least one condition listed as follows, the optical imaging lens may produce the better image quality, more so if the optical imaging lens maintain suitable production yields: 2.90≤ALT/T4; 1.3≤G34/T2; 1.0≤G34/T3; 0.5≤G34/T4; 1.55≤Gaa/T1; 4.5≤Gaa/T2; and 1.40≤Gaa/T1. When the optical imaging lens of the present disclosure further satisfy at least one condition listed as follows, the overall volume of the optical imaging lens may be further maintained in an optimal value: 2.90≤ALT/T4≤5.06; 1.3≤G34/T2≤2.16; 1.0≤G34/T3≤2.0; 0.5≤G34/T4≤0.9; 1.55≤Gaa/T1≤2.87; 4.5≤Gaa/T2≤8.03; and 1.40≤Gaa/T1≤2.61.

When implementing the optical structure according to the example embodiments, one of ordinary skill in the art having the benefit of the present disclosure would appreciate that it may offer various advantages such as shorter lens length, smaller F number, larger field angle, better image quality, and higher production yield to improve drawbacks of the prior arts.

When implementing example embodiments, more details about the convex or concave surface could be incorporated for one specific lens element or broadly for plural lens elements to enhance the control for the system performance and/or resolution. It is noted that the details listed here could be incorporated in example embodiments if no inconsistency occurs.

Figures 6, 7:
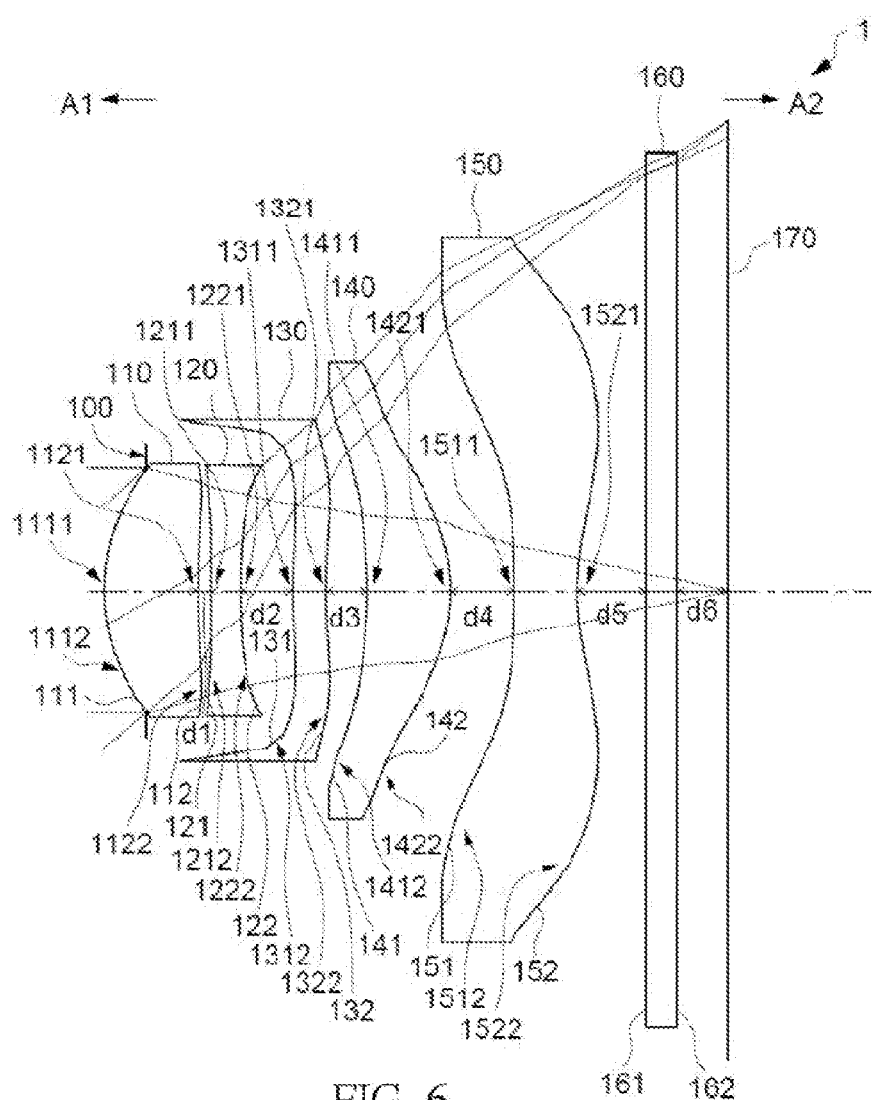
FIG. 6 is a cross-sectional view of a first embodiment of an optical imaging lens having six lens elements according to the present disclosure.
FIG. 7 is a chart of longitudinal spherical aberration and other kinds of optical aberrations of a first embodiment of the optical imaging lens according to the present disclosure.

Several exemplary embodiments and associated optical data will now be provided for illustrating example embodiments of optical imaging lens with good optical characteristics and a broadened shot angle. Reference is now made to FIGS. 6-9. FIG. 6 illustrates an example cross-sectional view of an optical imaging lens having six lens elements of the optical imaging lens according to a first example embodiment. FIG. 7 shows example charts of longitudinal spherical aberration and other kinds of optical aberrations of the optical imaging lens according to an example embodiment. FIG. 8 illustrates an example table of optical data of each lens element of the optical imaging lens according to an example embodiment, in which a focal length of the optical imaging lens is labelled as "f". FIG. 9 depicts an example table of aspherical data of the optical imaging lens according to an example embodiment.

As shown in FIG. 6, the optical imaging lens 1 of the present embodiment may comprise, in order from an object side A1 to an image side A2 along an optical axis, an aperture stop 100, a first lens element 110, a second lens element 120, a third lens element 130, a fourth lens element 140, and a fifth lens element. A filtering unit 160 and an image plane 170 of an image sensor may be positioned at the image side A2 of the optical lens 1. In some embodiments, the filtering unit 160 may be infrared cut filter and located between the fifth lens element 150 and an image plane 170. The filtering unit 160 may selectively absorb light with specific wavelengths from the light passing optical imaging lens 1. For example, IR light may be absorbed, and this may prohibit the IR light, which is not seen by human eyes, from producing an image on the image plane 170.

Exemplary embodiments of the optical imaging lens 1, wherein the first, second, third, fourth, and fifth lens elements 110, 120, 130, 140, 150, which may be constructed by plastic material, will now be described with reference to the drawings.

An example embodiment of the first lens element 110 may have positive refractive power, with an object-side surface 111 facing an object-side A1 and an image-side surface 112 facing an image-side A2. The object-side surface 111 may have a convex surface comprising a convex portion 1111 in a vicinity of the optical axis and a convex portion 1112 in a vicinity of a periphery of the first lens element 110. The image-side surface 112 may have a convex surface comprising a concave portion 1121 in a vicinity of the optical axis and a convex portion 1122 in a vicinity of a periphery of the first lens element 110. The object-side surface 111 and the image-side surface 112 of the first lens element 110 may both be aspherical surfaces.

An example embodiment of the second lens element 120 may have negative refractive power, with an object-side surface 121 facing an object-side A1 and an image-side surface 122 facing an image-side A2. The object-side surface 121 may have a concave surface comprising a concave portion 1211 in a vicinity of the optical axis and a concave portion 1212 in a vicinity of a periphery of the second lens element 120. The image-side surface 122 may have a concave surface comprising a concave portion 1221 in a vicinity of the optical axis and a concave portion 1222 in a vicinity of the periphery of the second lens element 120. The object-side surface 121 and the image-side surface 122 of the second lens element 120 may both be aspherical surfaces.

An example embodiment of the third lens element 130 may have positive refractive power, with an object-side surface 131 facing an object-side A1 and an image-side surface 132 facing an image-side A2. The object-side surface 131 may comprise a convex portion 1311 in a vicinity of the optical axis and a concave portion 1312 in a vicinity of a periphery of the third lens element 130. The image-side surface 132 may comprise a concave portion 1321 in a vicinity of the optical axis and a convex portion 1322 in a vicinity of the periphery of the third lens element 130. The object-side surface 131 and the image-side surface 132 of the third lens element 130 may both be aspherical surfaces.

An example embodiment of the fourth lens element 140 may have positive refractive power, with an object-side surface 141 facing an object-side A1 and an image-side surface 142 facing an image-side A2. The object-side surface 141 may have a concave surface comprising a concave portion 1411 in a vicinity of the optical axis and a concave portion 1412 in a vicinity of a periphery of the fourth lens element 140. The image-side surface 142 may have a convex surface comprising a convex portion 1421 in a vicinity of the optical axis and a convex portion 1422 in a vicinity of the periphery of the fourth lens element 140. The object-side surface 141 and the image-side surface 142 of the fourth lens element 140 are both aspherical surface.

An example embodiment of the fifth lens element 150 may have negative refractive power, with an object-side surface 151 facing an object-side A1 and an image-side surface 152 facing an image-side A2. The object-side surface 151 may be a concave surface comprising a concave portion 1511 in a vicinity of the optical axis and a concave portion 1512 in a vicinity of a periphery of the fifth lens element 150. The image-side surface 152 may comprise a concave portion 1521 in a vicinity of the optical axis and a convex portion 1522 in a vicinity of the periphery of the fifth lens element 150. The object-side surface 151 and the image-side surface 152 of the fifth lens element 150 may both be aspherical surfaces. In example embodiments, air gaps may exist or be disposed between the lens elements 110, 120, 130, 140, 150, the filtering unit 160 and the image plane 170 of the image sensor. In accordance with some embodiments, FIG. 6 illustrates the air gap d1 existing between the first lens element 110 and the second lens element 120, the air gap d2 existing between the second lens element 120 and the third lens element 130, the air gap d3 existing between the third lens element 130 and the fourth lens element 140, the air gap d4 existing between the fourth lens element 140 and the fifth lens element 150, the air gap d5 existing between the fifth lens element 150 and the sixth lens element 160, the air gap d6 existing between filtering unit 160 and the image plane 170 of the image sensor. However, in other embodiments, any of the aforesaid air gaps may not exist. The air gap d1 is denoted by G12, the air gap d2 is denoted by G23, the air gap d3 is denoted by G34, the air gap d4 is denoted by G45, and the sum of d1, d2, d3, d4 and d5 is denoted by Gaa.

FIG. 8 depicts the optical characteristics and air gaps of each lens elements in the optical imaging lens 1 of the present embodiment, and please refer to FIG. 38 for the values of TTL, ALT, Gaa, BFL, ALT/G45, ALT/T1, ALT/T5, G45/T5, T4/G23, T4/G34, T4/T1, T4/T5, T5/T1, ALT/T4, G34/T2, G34/T3, G34/T4, Gaa/T1, Gaa/T2, T5/T2, G45/T2, and G45/T3 of the present embodiment. The optical imaging lens 1 which shows that the distance from the object-side surface 111 of the first lens element 110 to the image plane 170 along the optical axis is 4.204 mm with an image height of 3.17 mm.

In some embodiments, the object-side surface 111 and the image-side surface 112 of the first lens element 110, the object-side surface 121 and the image-side surface 122 of the second lens element 120, the object-side surface 131 and the image-side surface 132 of the third lens element 130, the object-side surface 141 and the image-side surface 142 of the fourth lens element 140, the object-side surface 151 and the image-side surface 152 of the fifth lens element 150, are all 10 aspherical surfaces defined by the following aspherical formula:

$$Z(Y) = \frac{Y^2}{R} \bigg/ \left(1 + \sqrt{1 - (1+K)\frac{Y^2}{R^2}}\right) + \sum_{i=1}^{n} a_{2i} \times Y^{2i}$$

wherein,

R represents the radius of curvature of the surface of the lens element;

Z represents the depth of the aspherical surface (the perpendicular distance between the point of the aspherical surface at a distance Y from the optical axis and the tangent plane of the vertex on the optical axis of the aspherical surface);

Y represents the perpendicular distance between the point of the aspherical surface and the optical axis;

K represents a conic constant;

$a_{2i}$ represents an aspherical coefficient of $2i^{th}$ level.

The values of each aspherical parameter are shown in FIG. 9.

As illustrated in FIG. 7, longitudinal spherical aberration (a), the curves of different wavelengths may be closed to each other. This may represent that off-axis light with respect to these wavelengths (470 nm, 555 nm, 650 nm) is focused around an image point. From the vertical deviation of each curve shown therein, the offset of the off-axis light relative to the image point may be within about ±0.025 mm. Therefore, the present embodiment may improve the longitudinal spherical aberration with respect to different wavelengths. Furthermore, the longitudinal spherical aberrations for those three representative wavelengths are all very close, that means the longitudinal spherical aberration may indeed be improved.

Please also refer to FIG. 7, astigmatism aberration in the sagittal direction (b) and astigmatism aberration in the tangential direction (c). The horizontal axis defined as focal length and the vertical axis defined as image height, wherein the image height may be about 2.3 mm as shown therein. The focus variation with respect to the three wavelengths in the sagittal direction of the whole field may fall within about ±0.25 mm, while the focus variation in the tangential direction of the whole field may fall within about ±0.25 mm. This reflects the optical imaging lens 1 of the present embodiment eliminates aberration effectively. Additionally, the closed curves represent that dispersion may be improved.

Please refer to FIG. 7, distortion aberration (d), which shows that the distortion aberration of the optical imaging lens 1 may be within about ±2.5%. The horizontal axis may be defined as percentage and the vertical axis defined as image height, wherein the image height is about 2.3 mm as shown therein.

Figure 10:
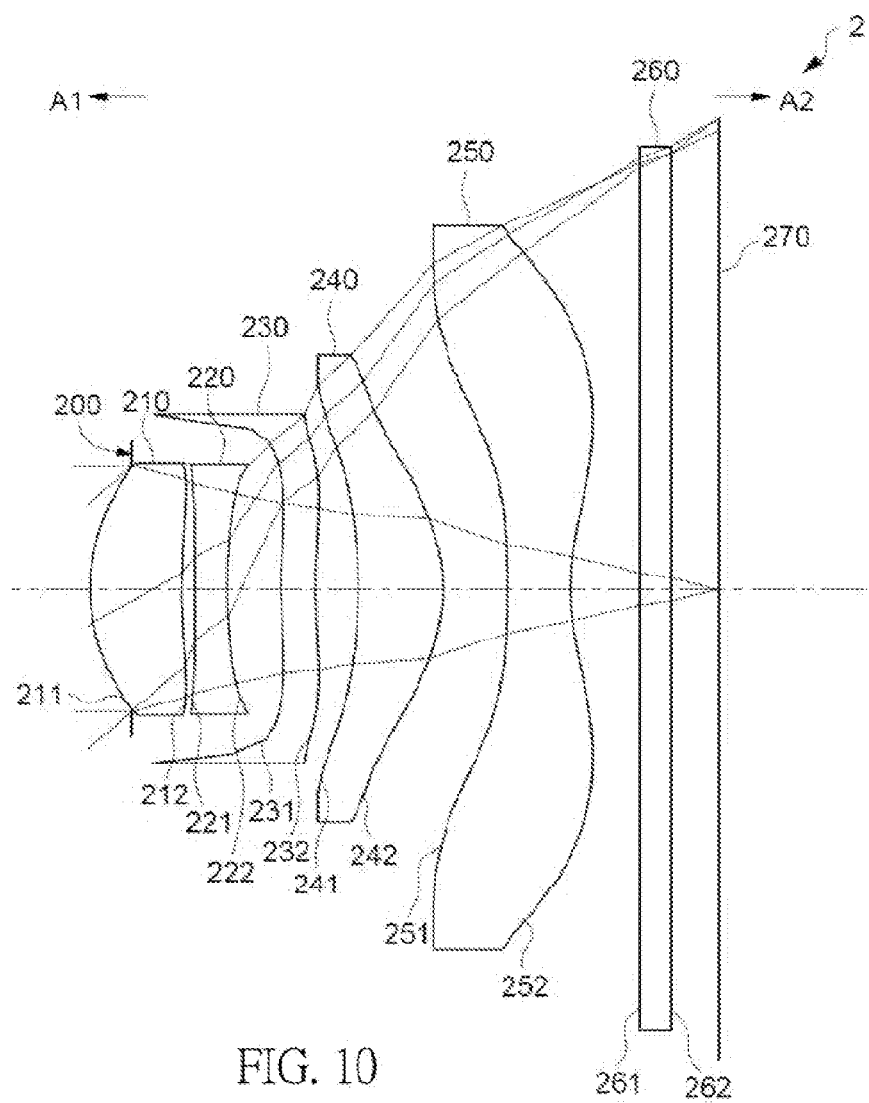
FIG. 10 is a cross-sectional view of a second embodiment of an optical imaging lens having six lens elements according to the present disclosure.
Figure 11:
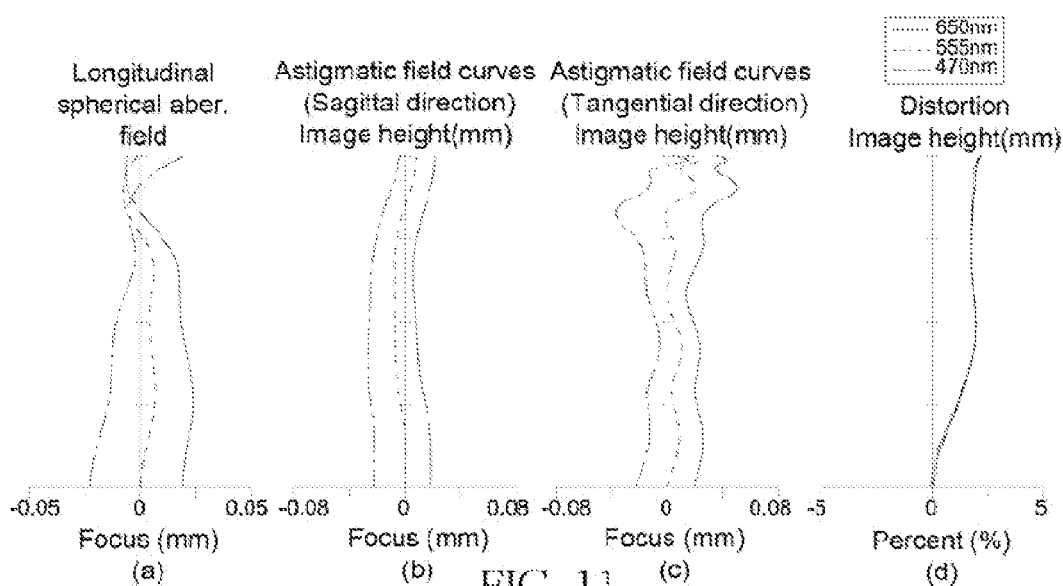
FIG. 11 is a chart of longitudinal spherical aberration and other kinds of optical aberrations of a second embodiment of the optical imaging lens according to the present disclosure.

Reference is now made to FIGS. 10-13. FIG. 10 illustrates an example cross-sectional view of an optical imaging lens 2 having five lens elements of the optical imaging lens according to a second example embodiment. FIG. 11 shows example charts of longitudinal spherical aberration and other kinds of optical aberrations of the optical imaging lens 2 according to the second example embodiment. FIG. 12 shows an example table of optical data of each lens element of the optical imaging lens 2 according to the second example embodiment. FIG. 13 shows an example table of aspherical data of the optical imaging lens 2 according to the second example embodiment. The reference numbers labeled in the present embodiment are similar to those in the first embodiment for the similar elements, but here the reference numbers are initialed with 2, for example, reference number 231 for labeling the object-side surface of the third lens element 230, reference number 232 for labeling the image-side surface of the third lens element 230, etc.

As shown in FIG. 10, the optical imaging lens 2 of the present embodiment, in an order from an object side A1 to an image side A2 along an optical axis, may comprise an aperture stop 200, a first lens element 210, a second lens element 220, a third lens element 230, a fourth lens element 240, and a fifth lens element 250.

The differences between the second embodiment and the first embodiment may include the radius of curvature and thickness of each lens element, aspherical parameters, back focal length, but the configuration of the positive/negative refractive power of the first, second, third, fourth, and fifth lens elements 210, 220, 230, 240, 250, and configuration of the concave/convex shape of surfaces, comprising the object-side surfaces 211, 221, 231, 241, 251 facing to the object side A1 and the image-side surfaces 212, 222, 232, 242, 252 facing to the image side A2, may be similar to those in the first embodiment. Here, for clearly showing the drawings of the present embodiment, only the surface shapes which may be different from that in the first embodiment are labeled. FIG. 12 depicts the optical characteristics and air gaps of each lens elements in the optical imaging lens 2 of the present embodiment, and please refer to FIG. 38 for the values of TTL, ALT, Gaa, BFL, ALT/G45, ALT/T1, ALT/T5, G45/T5, T4/G23, T4/G34, T4/T1, T4/T5, T5/T1, ALT/T4, G34/T2, G34/T3, G34/T4, Gaa/T1, Gaa/T2, T5/T2, G45/T2, and G45/T3 of the present embodiment.

The optical imaging lens 2 which shows that the distance from the object-side surface 211 of the first lens element 210 to the image plane 270 along the optical axis is 4.226 mm with an image height of 3.17 mm may be shortened, as compared with that of the conventional optical imaging lens.

As shown in FIG. 11, the optical imaging lens 2 of the present embodiment may exhibit improved characteristics in longitudinal spherical aberration (a), astigmatism in the sagittal direction (b), astigmatism in the tangential direction (c), and distortion aberration (d). The present embodiment may exhibit better characteristics in the longitudinal spherical aberration (a), which may be within about ±0.025 mm, and it also shows a better characteristics in the astigmatism in the sagittal direction (b), which may be within about ±0.04 mm, and astigmatism in the tangential direction (c), which may be within about ±0.08 mm. FIG. 11(d) shows distortion aberration, which indicating the distortion aberration of the optical imaging lens 2 is within about ±2.5%.

Therefore, from FIGS. 11(a)~11(d), the optical imaging lens 2 of the present embodiment can offer the advantages of larger field angle, better image quality, smaller distortion and higher production yield compared with the first embodiment.

Figure 14:
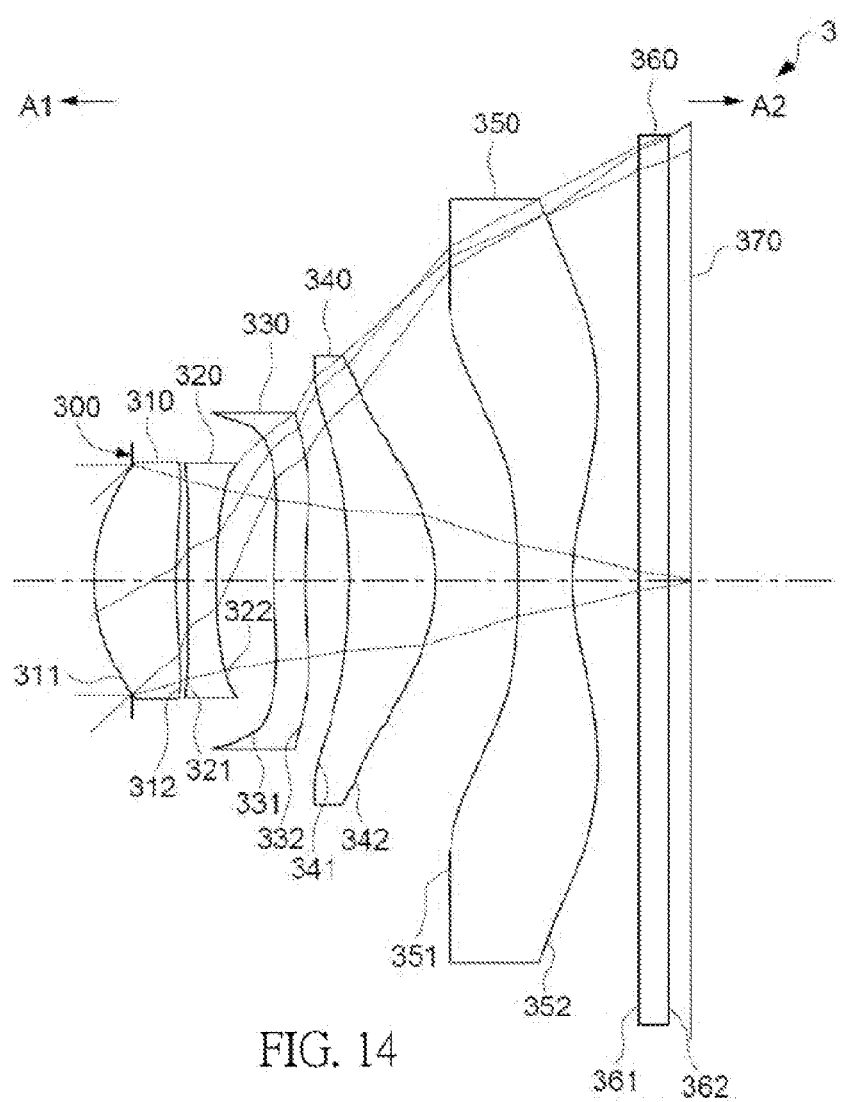
FIG. 14 is a cross-sectional view of a third embodiment of an optical imaging lens having six lens elements according to the present disclosure.
Figure 15:
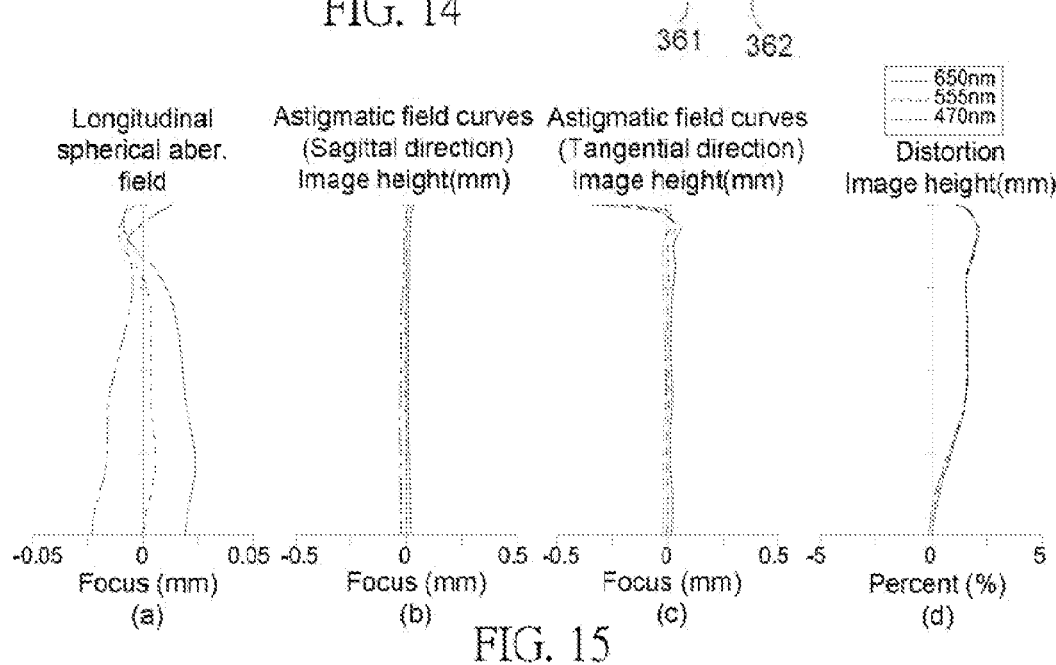
FIG. 15 is a chart of longitudinal spherical aberration and other kinds of optical aberrations of a third embodiment of the optical imaging lens according the present disclosure.

Reference is now made to FIGS. 14-17. FIG. 14 illustrates an example cross-sectional view of an optical imaging lens 3 having five lens elements of the optical imaging lens according to a third example embodiment. FIG. 15 shows example charts of longitudinal spherical aberration and other kinds of optical aberrations of the optical imaging lens 3 according to the third example embodiment. FIG. 16 shows an example table of optical data of each lens element of the optical imaging lens 3 according to the third example embodiment. FIG.

17 shows an example table of aspherical data of the optical imaging lens 3 according to the third example embodiment. The reference numbers labeled in the present embodiment are similar to those in the first embodiment for the similar elements, but here the reference numbers are initialed with 3, for example, reference number 331 for labeling the object-side surface of the third lens element 330, reference number 332 for labeling the image-side surface of the third lens element 330, etc.

As shown in FIG. 14, the optical imaging lens 3 of the present embodiment, in an order from an object side A1 to an image side A2 along an optical axis, may comprise an aperture stop 300, a first lens element 310, a second lens element 320, a third lens element 330, a fourth lens element 340, and a fifth lens element 350.

The differences between the third embodiment and the first embodiment may include the radius of curvature and thickness of each lens element, aspherical parameters, back focal length, but the configuration of the positive/negative refractive power of the first, second, third, fourth, and fifth lens elements 310, 320, 330, 340, 350, and configuration of the concave/convex shape of surfaces, comprising the object-side surfaces 311, 321, 331, 341, 351 facing to the object side A1 and the image-side surfaces 312, 322, 332, 342, 352 facing to the image side A2, may be similar to those in the first embodiment. Here, for clearly showing the drawings of the present embodiment, only the surface shapes which may be different from that in the first embodiment are labeled. FIG. 16 depicts the optical characteristics and air gaps of each lens elements in the optical imaging lens 3 of the present embodiment, and please refer to FIG. 38 for the values of TTL, ALT, Gaa, BFL, ALT/G45, ALT/T1, ALT/T5, G45/T5, T4/G23, T4/G34, T4/T1, T4/T5, T5/T1, ALT/T4, G34/T2, G34/T3, G34/T4, Gaa/T1, Gaa/T2, T5/T2, G45/T2, and G45/T3 of the present embodiment.

The optical imaging lens 3 which shows that the distance from the object-side surface 311 of the first lens element 310 to the image plane 370 along the optical axis is about 4.185 mm with an image height of about 3.17 mm is shortened, compared with that of the conventional optical imaging lens.

As shown in FIG. 15, the optical imaging lens 3 of the present embodiment shows great characteristics in longitudinal spherical aberration (a), astigmatism in the sagittal direction (b), astigmatism in the tangential direction (c), and distortion aberration (d). The present embodiment may exhibit better characteristics in the longitudinal spherical aberration (a), which may be within about ±0.025 mm, and it also shows a better characteristics in the astigmatism in the sagittal direction (b), which may be within about ±0.25 mm, and astigmatism in the tangential direction (c), which may be within about ±0.25 mm. FIG. 15(d) shows distortion aberration, which indicating the distortion aberration of the optical imaging lens 3 may be within about ±2.5%. Therefore, according to the above illustration, the optical imaging lens of the present embodiment may indeed exhibit larger field angle, and higher production yield compared with the first embodiment.

Figure 18:
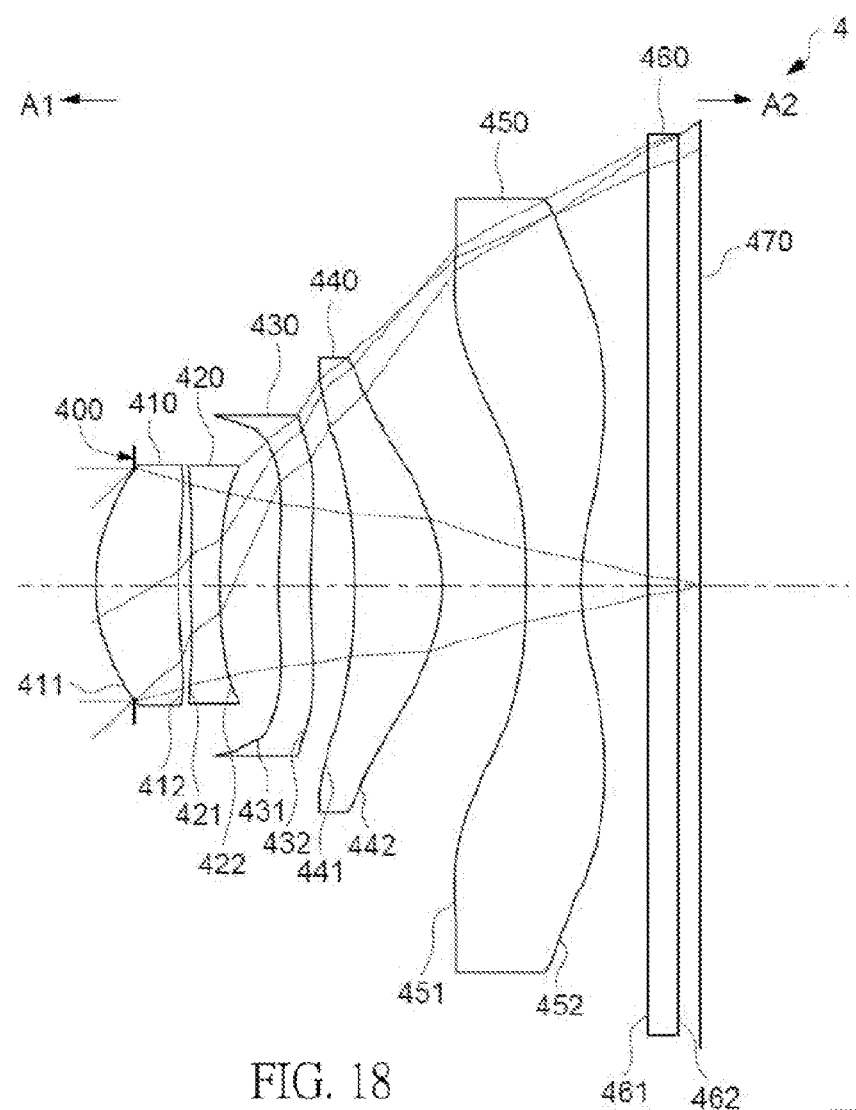
FIG. 18 is a cross-sectional view of a fourth embodiment of an optical imaging lens having six lens elements according to the present disclosure.
Figure 19:
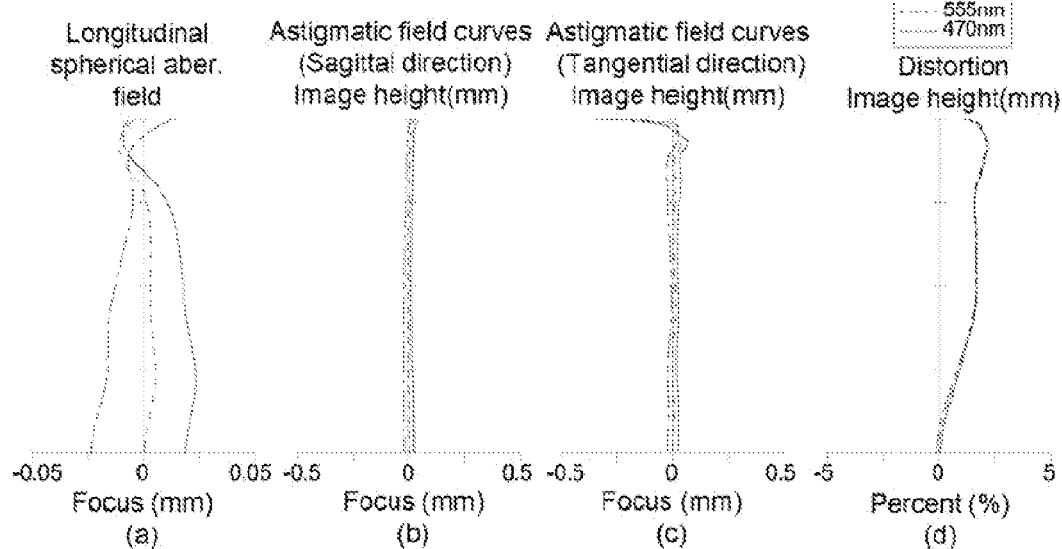
FIG. 19 is a chart of longitudinal spherical aberration and other kinds of optical aberrations of a fourth embodiment of the optical imaging lens according the present disclosure.

Reference is now made to FIGS. 18-21. FIG. 18 illustrates an example cross-sectional view of an optical imaging lens 4 having five lens elements of the optical imaging lens according to a fourth example embodiment. FIG. 19 shows example charts of longitudinal spherical aberration and other kinds of optical aberrations of the optical imaging lens 4 according to the fourth embodiment. FIG. 20 shows an example table of optical data of each lens element of the optical imaging lens 4 according to the fourth example embodiment. FIG. 21 shows an example table of aspherical data of the optical imaging lens 4 according to the fourth example embodiment. The reference numbers labeled in the present embodiment are similar to those in the first embodiment for the similar elements, but here the reference numbers are initialed with 4, for example, reference number 431 for labeling the object-side surface of the third lens element 430, reference number 432 for labeling the image-side surface of the third lens element 430, etc.

As shown in FIG. 18, the optical imaging lens 4 of the present embodiment, in an order from an object side A1 to an image side A2 along an optical axis, may comprise an aperture stop 400, a first lens element 410, a second lens element 420, a third lens element 430, a fourth lens element 440, and a fifth lens element 450.

The differences between the fourth embodiment and the first embodiment may include the radius of curvature and thickness of each lens element, aspherical parameters, back focal length, but the configuration of the positive/negative refractive power of the first, second, third, fourth, and fifth lens elements 410, 420, 430, 440, 450, and configuration of the concave/convex shape of surfaces, comprising the object-side surfaces 411, 421, 431, 441, 451 facing to the object side A1 and the image-side surfaces 412, 422, 432, 442, 452 facing to the image side A2, may be similar to those in the first embodiment. Here, for clearly showing the drawings of the present embodiment, only the surface shapes which are different from that in the first embodiment are labeled. FIG. 20 depicts the optical characteristics and air gaps of each lens elements in the optical imaging lens 3 of the present embodiment, and please refer to FIG. 38 for the values of TTL, ALT, Gaa, BFL, ALT/G45, ALT/T1, ALT/T5, G45/T5, T4/G23, T4/G34, T4/T1, T4/T5, T5/T1, ALT/T4, G34/T2, G34/T3, G34/T4, Gaa/T1, Gaa/T2, T5/T2, G45/T2, and G45/T3 of the present embodiment.

The optical imaging lens 4 which shows that the distance from the object-side surface 411 of the first lens element 410 to the image plane 470 along the optical axis is 4.185 mm with an image height of 3.17 mm is shortened, compared with that of the conventional optical imaging lens.

As shown in FIG. 19, the optical imaging lens 4 of the present embodiment may exhibit great characteristics in longitudinal spherical aberration (a), astigmatism in the sagittal direction (b), astigmatism in the tangential direction (c), and distortion aberration (d). The present embodiment may exhibit better characteristics in the longitudinal spherical aberration (a), which may be within about ±0.025 mm, and it also shows a better characteristics in the astigmatism in the sagittal direction (b), which may be within about ±0.25 mm, and astigmatism in the tangential direction (c), which may be within about ±0.25 mm. FIG. 19(d) shows distortion aberration, which indicating the distortion aberration of the optical imaging lens 4 may be within about ±2.5%. Therefore, according to the above illustration, the optical imaging lens of the present embodiment indeed shows larger field angle, and higher production yield compared with the first embodiment.

Figure 22:
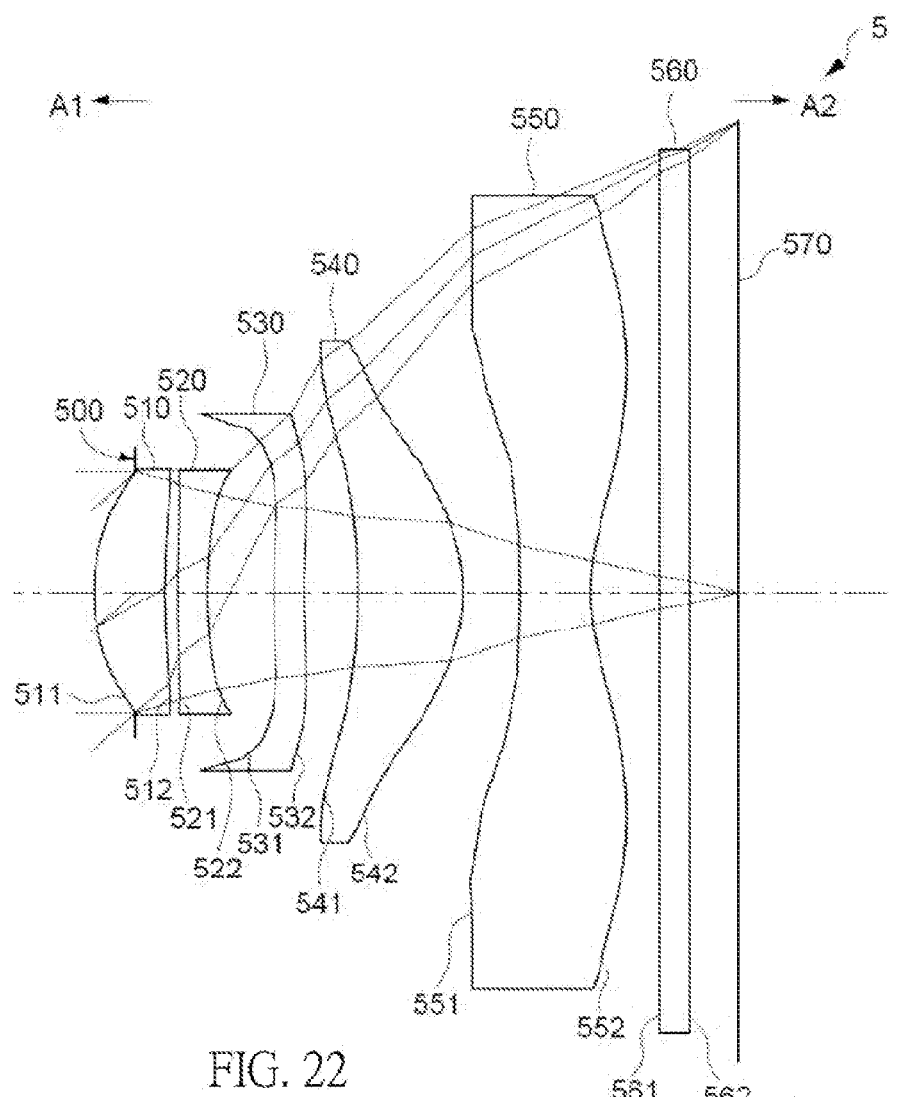
FIG. 22 is a cross-sectional view of a fifth embodiment of an optical imaging lens having six lens elements according to the present disclosure.
Figure 23:
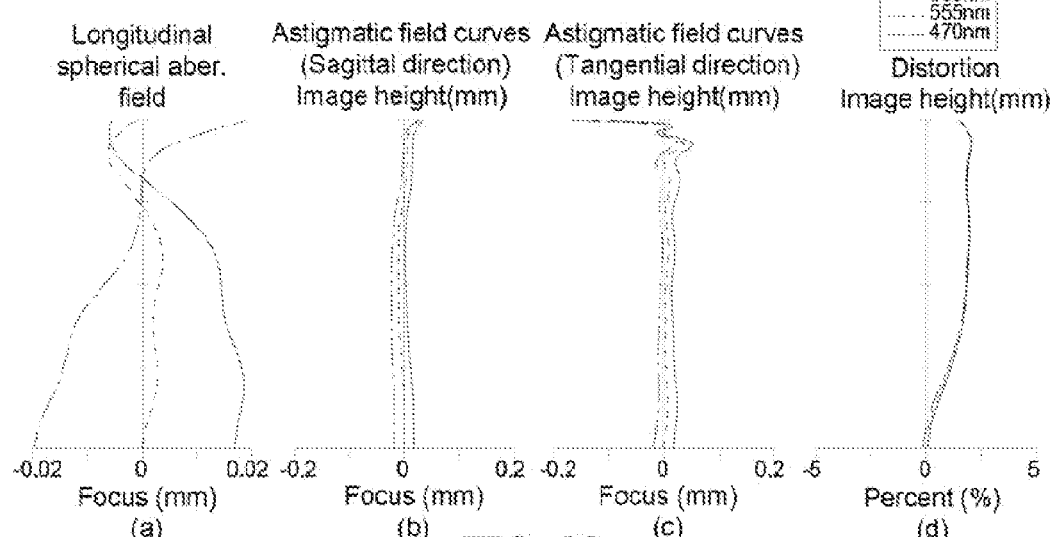
FIG. 23 is a chart of longitudinal spherical aberration and other kinds of optical aberrations of a fifth embodiment of the optical imaging lens according the present disclosure.

Reference is now made to FIGS. 22-25. FIG. 22 illustrates an example cross-sectional view of an optical imaging lens 5 having five lens elements of the optical imaging lens according to a fifth example embodiment. FIG. 23 shows example charts of longitudinal spherical aberration and other kinds of optical aberrations of the optical imaging lens 5 according to the fifth embodiment. FIG. 24 shows an example table of optical data of each lens element of the optical imaging lens 5 according to the fifth example embodiment. FIG. 25 shows an example table of aspherical data of the optical imaging lens 5 according to the fifth example embodiment. The reference numbers labeled in the present embodiment are similar to those in the first embodiment for the similar elements, but here the reference numbers are initialed with 5, for example, reference number 531 for labeling the object-side surface of the third lens element 530, reference number 532 for labeling the image-side surface of the third lens element 530, etc.

As shown in FIG. 22, the optical imaging lens 5 of the present embodiment, in an order from an object side A1 to an image side A2 along an optical axis, may comprise an aperture stop 500, a first lens element 510, a second lens element 520, a third lens element 530, a fourth lens element 540, and a fifth lens element 550.

The differences between the fifth embodiment and the first embodiment may include the radius of curvature and thickness of each lens element, aspherical parameters, back focal length, but the configuration of the positive/negative refractive power of the first, second, third, fourth, and fifth lens elements 510, 520, 530, 540, 550, and configuration of the concave/convex shape of surfaces, comprising the object-side surfaces 511, 521, 531, 541, 551 facing to the object side A1 and the image-side surfaces 512, 522, 532, 542, 552 facing to the image side A2, may be similar to those in the first embodiment. Here, for clearly showing the drawings of the present embodiment, only the surface shapes which are different from that in the first embodiment are labeled. FIG. 24 depicts the optical characteristics and air gaps of each lens elements in the optical imaging lens 3 of the present embodiment, and please refer to FIG. 38 for the values of TTL, ALT, Gaa, BFL, ALT/G45, ALT/T1, ALT/T5, G45/T5, T4/G23, T4/G34, T4/T1, T4/T5, T5/T1, ALT/T4, G34/T2, G34/T3, G34/T4, Gaa/T1, Gaa/T2, T5/T2, G45/T2, and G45/T3 of the present embodiment.

The optical imaging lens 5 which shows that the distance from the object-side surface 511 of the first lens element 510 to the image plane 570 along the optical axis may be about 4.406 mm with an image height of about 3.17 mm is shortened, compared with that of the conventional optical imaging lens.

As shown in FIG. 23, the optical imaging lens 5 of the present embodiment may exhibit improved characteristics in longitudinal spherical aberration (a), astigmatism in the sagittal direction (b), astigmatism in the tangential direction (c), and distortion aberration (d). The present embodiment may exhibit better characteristics in the longitudinal spherical aberration (a), which may be within about ±0.02 mm, and it also shows a better characteristics in the astigmatism in the sagittal direction (b), which may be within about ±0.2 mm, and astigmatism in the tangential direction (c), which may be within about ±0.2 mm. FIG. 23(d) shows distortion aberration, which indicating the distortion aberration of the optical imaging lens 5 may be within about ±2.5%. Therefore, according to the above illustration, the optical imaging lens of the present embodiment indeed shows larger field angle, better image quality, smaller distortion and higher production yield compared with the first embodiment.

Figure 26:
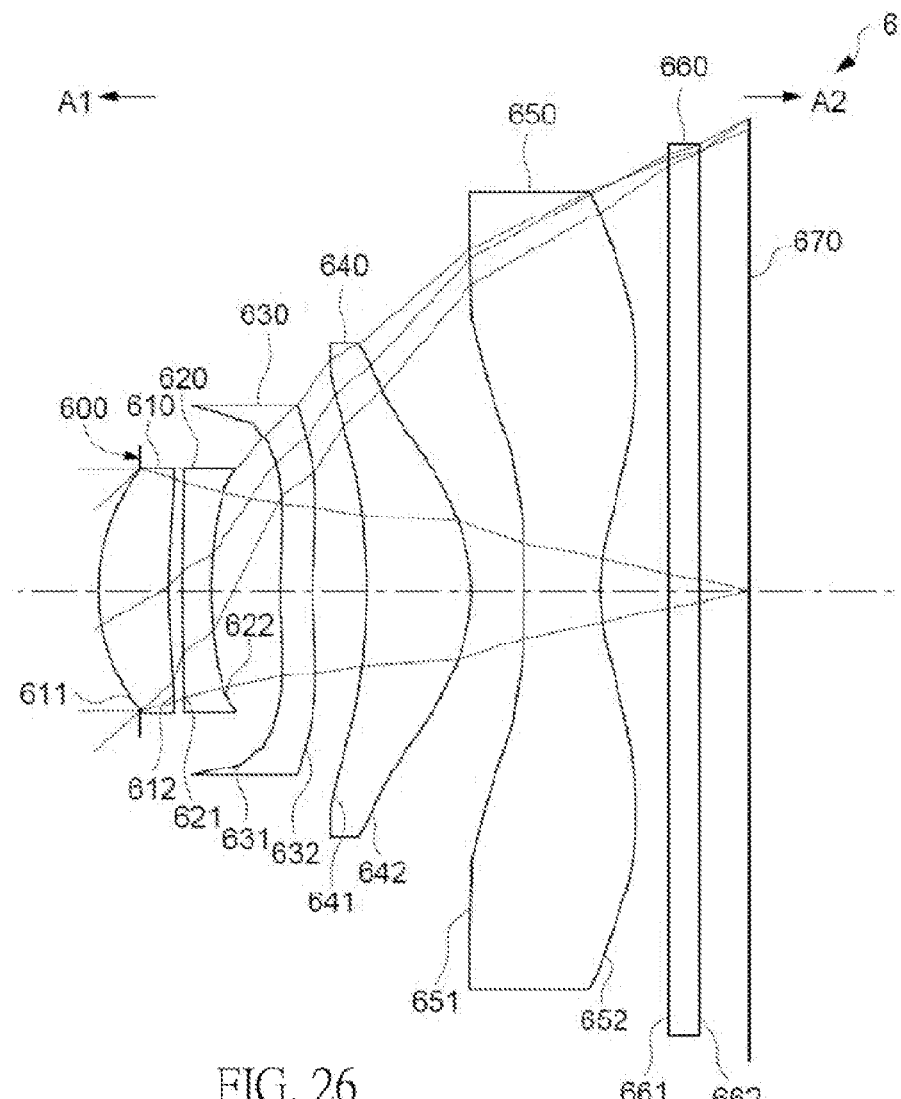
FIG. 26 is a cross-sectional view of a sixth embodiment of an optical imaging lens having six lens elements according to the present disclosure.
Figure 27:
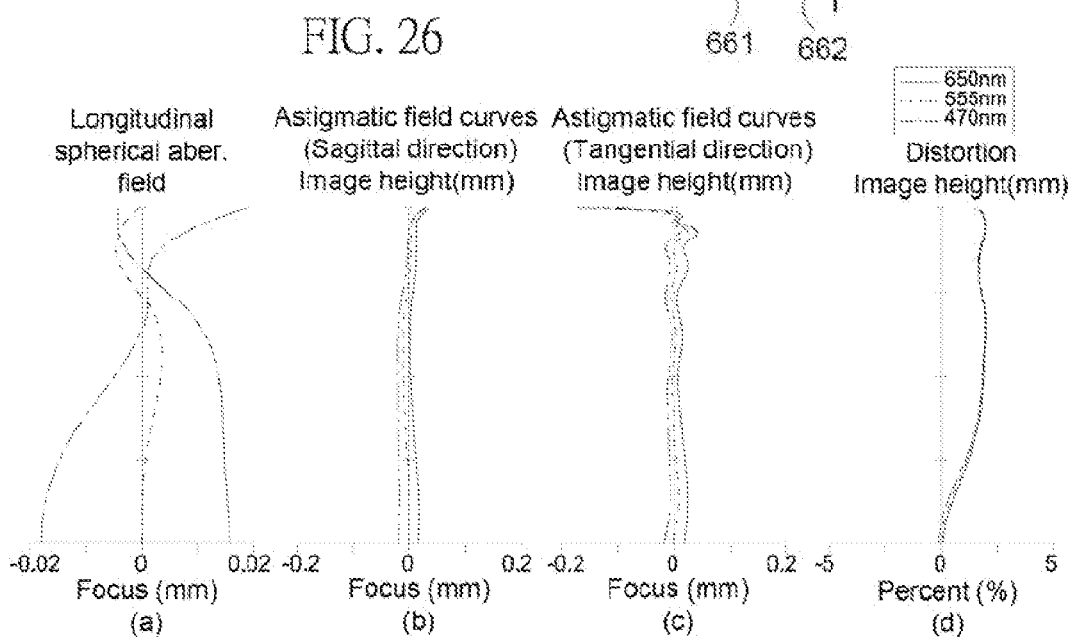
FIG. 27 is a chart of longitudinal spherical aberration and other kinds of optical aberrations of a sixth embodiment of the optical imaging lens according the present disclosure.

Reference is now made to FIGS. 26-29. FIG. 26 illustrates an example cross-sectional view of an optical imaging lens 6 having five lens elements of the optical imaging lens according to a sixth example embodiment. FIG. 27 shows example charts of longitudinal spherical aberration and other kinds of optical aberrations of the optical imaging lens 6 according to the sixth embodiment. FIG. 28 shows an example table of optical data of each lens element of the optical imaging lens 6 according to the sixth example embodiment. FIG. 29 shows an example table of aspherical data of the optical imaging lens 6 according to the sixth example embodiment. The reference numbers labeled in the present embodiment are similar to those in the first embodiment for the similar elements, but here the reference numbers are initialed with 6, for example, reference number 631 for labeling the object-side surface of the third lens element 630, reference number 632 for labeling the image-side surface of the third lens element 630, etc.

As shown in FIG. 26, the optical imaging lens 6 of the present embodiment, in an order from an object side A1 to an image side A2 along an optical axis, may comprise an aperture stop 600, a first lens element 610, a second lens element 620, a third lens element 630, a fourth lens element 640, and a fifth lens element 650.

The differences between the sixth embodiment and the first embodiment may include the radius of curvature and thickness of each lens element and aspherical parameters, back focal length, but the configuration of the positive/negative refractive power of the first, second, third, fourth, and fifth lens elements 610, 620, 630, 640, 650, and configuration of the concave/convex shape of surfaces, comprising the object-side surfaces 611, 621, 631, 641, 651 facing to the object side A1 and the image-side surfaces 612, 622, 632, 642, 652 facing to the image side A2, may be similar to those in the first embodiment. Here, for clearly showing the drawings of the present embodiment, only the surface shapes which are different from that in the first embodiment are labeled. FIG. 26 depicts the optical characteristics and air gaps of each lens elements in the optical imaging lens 6 of the present embodiment, and please refer to FIG. 38 for the values of TTL, ALT, Gaa, BFL, ALT/G45, ALT/T1, ALT/T5, G45/T5, T4/G23, T4/G34, T4/T1, T4/T5, T5/T1, ALT/T4, G34/T2, G34/T3, G34/T4, Gaa/T1, Gaa/T2, T5/T2, G45/T2, and G45/T3 of the present embodiment.

The optical imaging lens 6 which shows that the distance from the object-side surface 611 of the first lens element 610 to the image plane 670 along the optical axis may be about 4.432 mm with an image height of about 3.17 mm may be shortened, compared with that of the conventional optical imaging lens.

As shown in FIG. 27, the optical imaging lens 6 of the present embodiment may exhibit improved characteristics in longitudinal spherical aberration (a), astigmatism in the sagittal direction (b), astigmatism in the tangential direction (c), and distortion aberration (d). The present embodiment shows a better characteristics in the longitudinal spherical aberration (a), which may be within about ±0.02 mm, and it also shows a better characteristics in the astigmatism in the sagittal direction (b), which may be within about ±0.2 mm, and astigmatism in the tangential direction (c), which may be within about ±0.2 mm. FIG. 27(d) shows distortion aberration, which indicating the distortion aberration of the optical imaging lens 6 may be within about ±2.5%. Therefore, according to the above illustration, the optical imaging lens of the present embodiment may exhibit larger field angle, better image quality, smaller distortion and higher production yield compared with the first embodiment.

Figure 30:
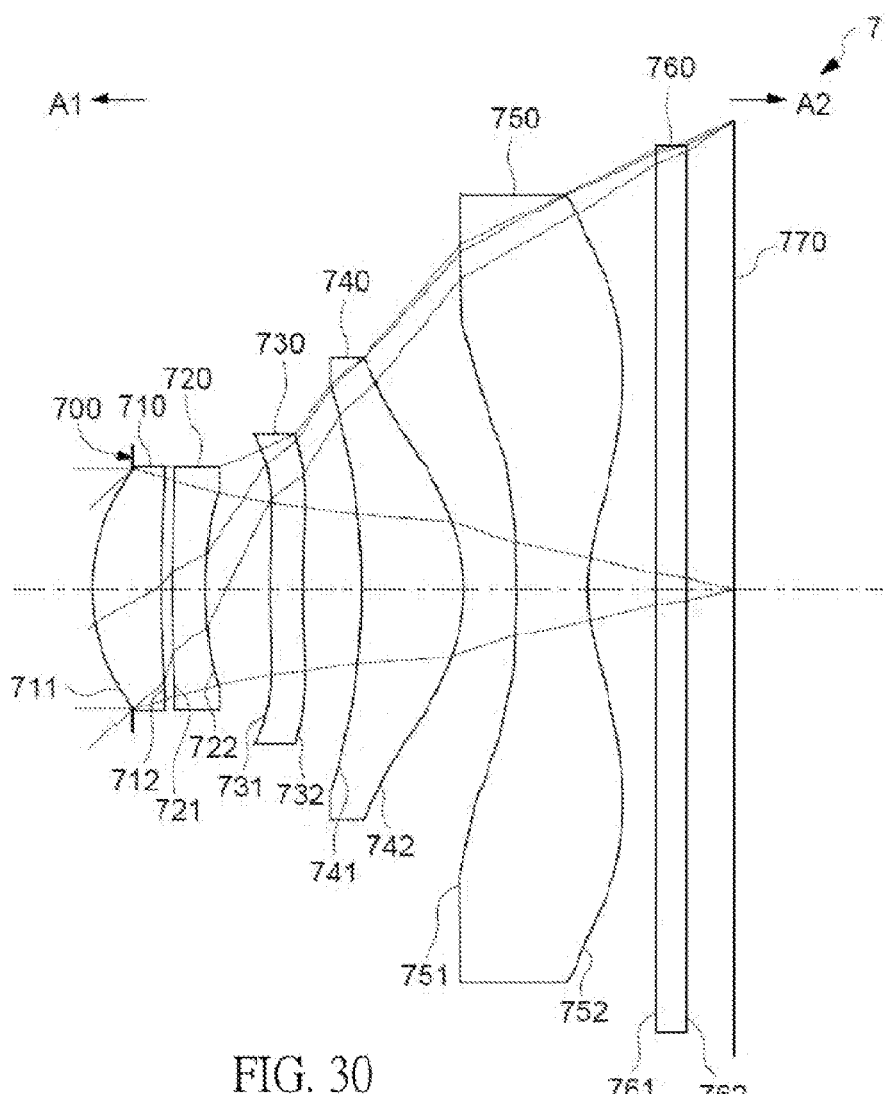
FIG. 30 is a cross-sectional view of a seventh embodiment of an optical imaging lens having six lens elements according to the present disclosure.
Figure 31:
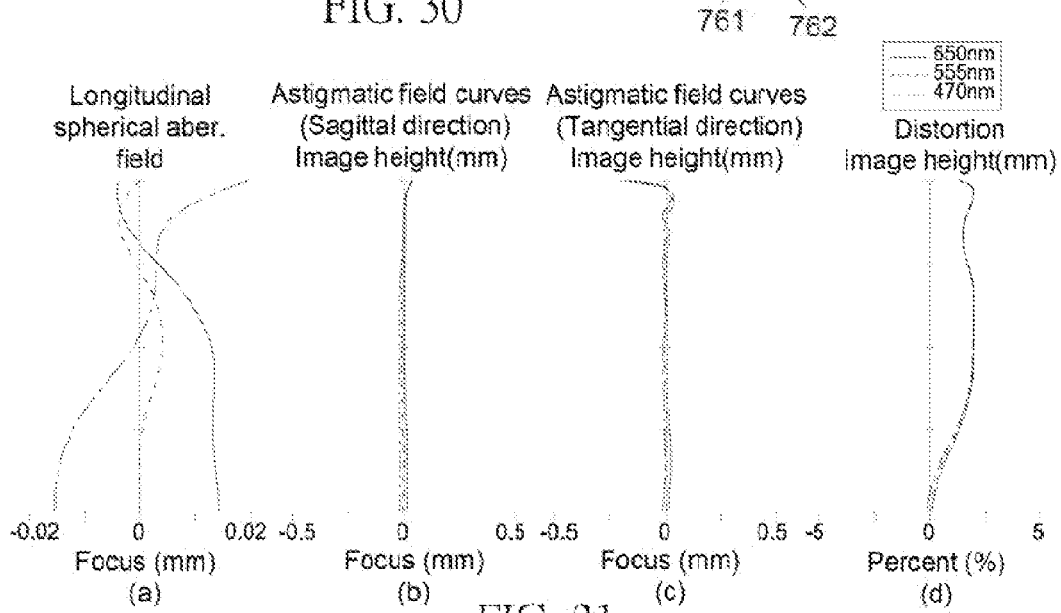
FIG. 31 is a chart of longitudinal spherical aberration and other kinds of optical aberrations of a seventh embodiment of the optical imaging lens according the present disclosure.

Reference is now made to FIGS. 30-33. FIG. 30 illustrates an example cross-sectional view of an optical imaging lens 7 having five lens elements of the optical imaging lens according to a seventh example embodiment. FIG. 31 shows example charts of longitudinal spherical aberration and other kinds of optical aberrations of the optical imaging lens 7 according to the seventh embodiment. FIG. 32 shows an example table of optical data of each lens element of the optical imaging lens 7 according to the seventh example embodiment. FIG. 33 shows an example table of aspherical data of the optical imaging lens 7 according to the seventh example embodiment. The reference numbers labeled in the present embodiment are similar to those in the first embodiment for the similar elements, but here the reference numbers are initialed with 7, for example, reference number 731 for labeling the object-side surface of the third lens element 730, reference number 732 for labeling the image-side surface of the third lens element 730, etc.

As shown in FIG. 30, the optical imaging lens 7 of the present embodiment, in an order from an object side A1 to an image side A2 along an optical axis, may comprise an aperture stop 700, a first lens element 710, a second lens element 720, a third lens element 730, a fourth lens element 740, and a fifth lens element 750.

The differences between the seventh embodiment and the first embodiment may include the radius of curvature and thickness of each lens element, aspherical parameters, back focal length, but the configuration of the positive/negative refractive power of the first, second, third, fourth, and fifth lens elements 710, 720, 730, 740, 750, and configuration of the concave/convex shape of surfaces, comprising the object-side surfaces 711, 721, 731, 741, 751 facing to the object side A1 and the image-side surfaces 712, 722, 732, 742, 752 facing to the image side A2, are similar to those in the first embodiment. Here, for clearly showing the drawings of the present embodiment, only the surface shapes which may be different from that in the first embodiment are labeled. FIG. 32 depicts the optical characteristics and air gaps of each lens elements in the optical imaging lens 3 of the present embodiment, and please refer to FIG. 38 for the values of TTL, ALT, Gaa, BFL, ALT/G45, ALT/T1, ALT/T5, G45/T5, T4/G23, T4/G34, T4/T1, T4/T5, T5/T1, ALT/T4, G34/T2, G34/T3, G34/T4, Gaa/T1, Gaa/T2, T5/T2, G45/T2, and G45/T3 of the present embodiment.

The optical imaging lens 7 which shows that the distance from the object-side surface 711 of the first lens element 710 to the image plane 770 along the optical axis may be about 4.414 mm with an image height of about 3.17 mm may be shortened, compared with that of the conventional optical imaging lens.

As shown in FIG. 31, the optical imaging lens 7 of the present embodiment shows great characteristics in longitudinal spherical aberration (a), astigmatism in the sagittal direction (b), astigmatism in the tangential direction (c), and distortion aberration (d). The present embodiment shows a better characteristics in the longitudinal spherical aberration (a), which is within ±0.02 mm, and it also shows a better characteristics in the astigmatism in the sagittal direction (b), which is within ±0.25 mm, and astigmatism in the tangential direction (c), which is within ±0.25 mm. FIG. 31(d) shows distortion aberration, which indicating the distortion aberration of the optical imaging lens 7 is within ±2.5%. Therefore, according to the above illustration, the optical imaging lens of the present embodiment indeed shows larger field angle, and higher production yield compared with the first embodiment.

Figure 34:
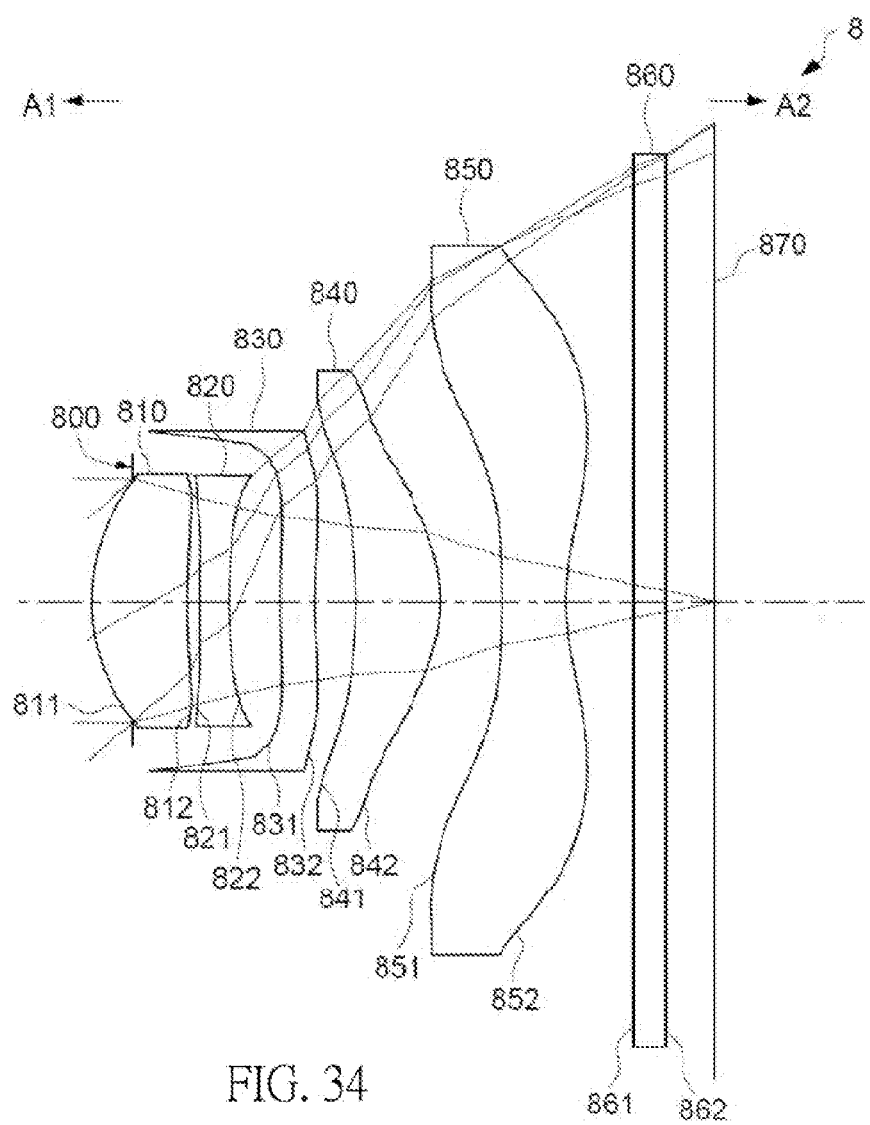
FIG. 34 is a cross-sectional view of an eighth embodiment of an optical imaging lens having six lens elements according to the present disclosure.
Figure 35:
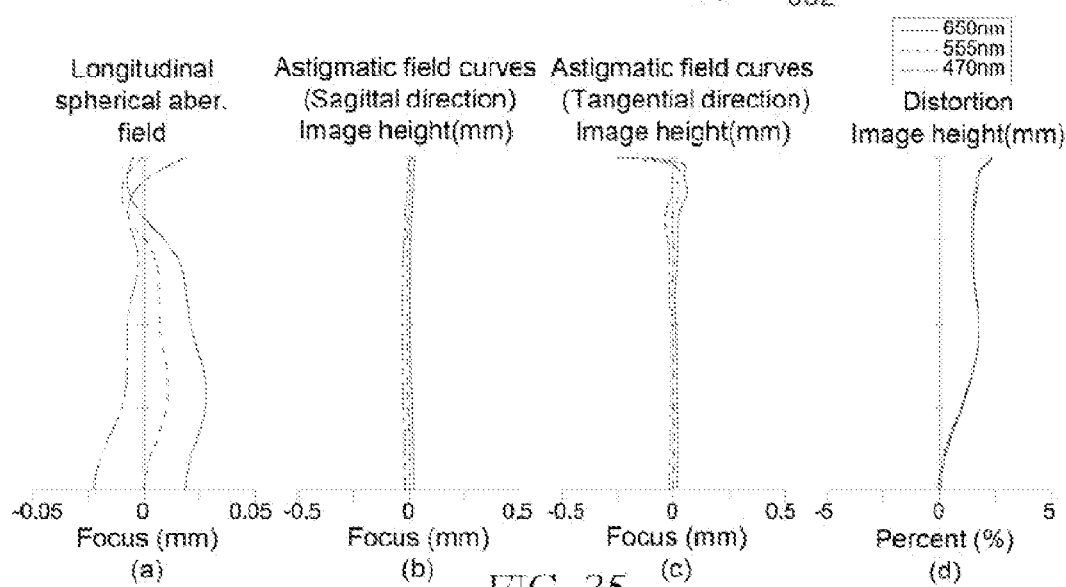
FIG. 35 is a chart of longitudinal spherical aberration and other kinds of optical aberrations of an eighth embodiment of the optical imaging lens according the present disclosure.

Reference is now made to FIGS. 34-37. FIG. 34 illustrates an example cross-sectional view of an optical imaging lens 8 having five lens elements of the optical imaging lens according to an eighth example embodiment. FIG. 35 shows example charts of longitudinal spherical aberration and other kinds of optical aberrations of the optical imaging lens 8 according to the eighth embodiment. FIG. 36 shows an example table of optical data of each lens element of the optical imaging lens 8 according to the eighth example embodiment. FIG. 37 shows an example table of aspherical data of the optical imaging lens 8 according to the eighth example embodiment. The reference numbers labeled in the present embodiment are similar to those in the first embodiment for the similar elements, but here the reference numbers are initialed with 8, for example, reference number 831 for labeling the object-side surface of the third lens element 830, reference number 832 for labeling the image-side surface of the third lens element 830, etc.

As shown in FIG. 34, the optical imaging lens 8 of the present embodiment, in an order from an object side A1 to an image side A2 along an optical axis, may comprise an aperture stop 800, a first lens element 810, a second lens element 820, a third lens element 830, a fourth lens element 840, and a fifth lens element 850.

The differences between the eighth embodiment and the first embodiment may include the radius of curvature and thickness of each lens element, a aspherical parameters, back focal length, but the configuration of the positive/negative refractive power of the first, second, third, fourth, and fifth lens elements 810, 820, 830, 840, 850, and configuration of the concave/convex shape of surfaces, comprising the object-side surfaces 811, 821, 831, 841, 851 facing to the object side A1 and the image-side surfaces 812, 822, 832, 842, 852 facing to the image side A2, may be similar to those in the first embodiment. Here, for clearly showing the drawings of the present embodiment, only the surface shapes which may be different from that in the first embodiment are labeled. FIG. 36 depicts the optical characteristics and air gaps of each lens elements in the optical imaging lens 3 of the present embodiment, and please refer to FIG. 38 for the values of TTL, ALT, Gaa, BFL, ALT/G45, ALT/T1, ALT/T5, G45/T5, T4/G23, T4/G34, T4/T1, T4/T5, T5/T1, ALT/T4, G34/T2, G34/T3, G34/T4, Gaa/T1, Gaa/T2, T5/T2, G45/T2, and G45/T3 of the present embodiment.

The optical imaging lens 8 which shows that the distance from the object-side surface 811 of the first lens element 810 to the image plane 870 along the optical axis may be about 4.236 mm with an image height of about 3.17 mm may be shortened, compared with that of the conventional optical imaging lens.

As shown in FIG. 35, the optical imaging lens 8 of the present embodiment may exhibit great characteristics in longitudinal spherical aberration (a), astigmatism in the sagittal direction (b), astigmatism in the tangential direction (c), and distortion aberration (d). The present embodiment shows a better characteristics in the longitudinal spherical aberration (a), which may be within about ±0.025 mm, and it also shows a better characteristics in the astigmatism in the sagittal direction (b), which may be within about ±0.25 mm, and astigmatism in the tangential direction (c), which may be within about +0.25 mm. FIG. 35(d) shows distortion aberration, which indicating the distortion aberration of the optical imaging lens 8 may be within about ±2.5%. Therefore, according to the above illustration, the optical imaging lens of the present embodiment indeed may exhibit larger field angle, and higher production yield compared with the first embodiment.

Please refer to FIG. 38 for the values of TTL, ALT, Gaa, BFL, ALT/G45, ALT/T1, ALT/T5, G45/T5, T4/G23, T4/G34, T4/T1, T4/T5, T5/T1, ALT/T4, G34/T2, G34/T3, G34/T4, Gaa/T1, Gaa/T2, T5/T2, G45/T2, and G45/T3 of all eight embodiments, and it is clear that the optical imaging lens of the present disclosure satisfy the Equations (1)~(18).

Figure 39:
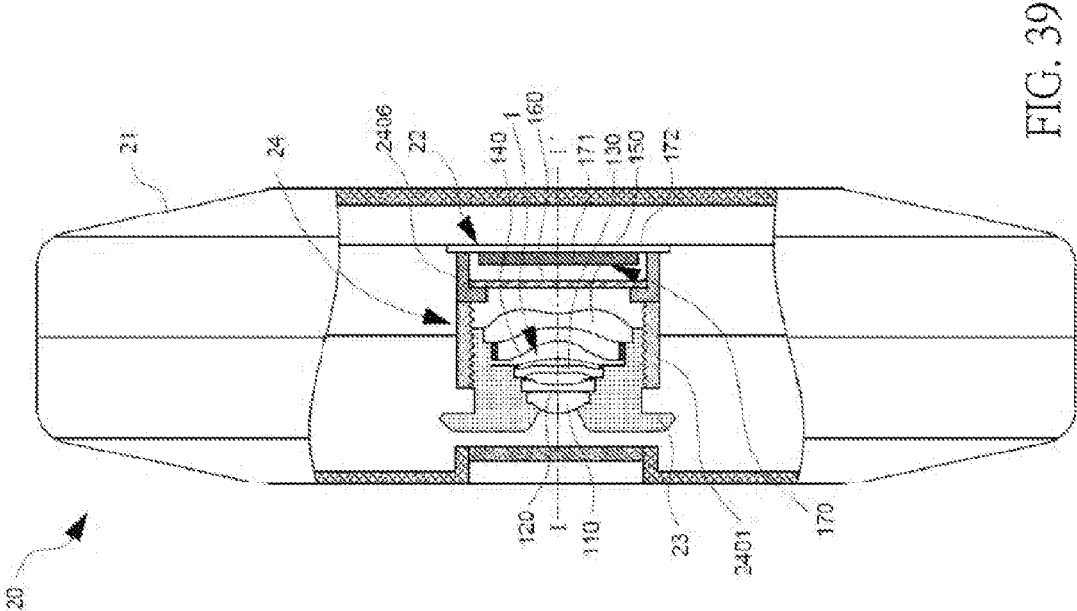
FIG. 39 is a structure of an example embodiment of a mobile device.

Reference is now made to FIG. 39, which illustrates an example structural view of a first embodiment of mobile device 20 applying an aforesaid optical imaging lens. The mobile device 20 may comprise a housing 21 and a photography module 22 positioned in the housing 21. Examples of the mobile device 20 may be, but are not limited to, mobile phones, tablet computers, personal digital assistants (PDA), gaming machines, such as video game consoles, handhold game console, etc., environmental monitors, event data recorders, reversing camera systems mounted on motor vehicles, wide-angle camera, etc.

As shown in FIG. 39, the photography module 22 may comprise an aforesaid optical imaging lens with six lens elements, which is a prime lens and for example the optical imaging lens 1 of the first embodiment, a lens barrel 23 for positioning the optical imaging lens 1, a module housing unit 24 suitable for positioning the lens barrel 23, a substrate 172 suitable for positioning the module housing unit 24, and an image sensor 171 which may be positioned at an image side of the optical imaging lens 1. The image plane 170 may be formed on the image sensor 171.

In some other example embodiments, the filtering unit 160 may be omitted. In some example embodiments, the housing 21, the lens barrel 23, and/or the module housing unit 24 may be integrated into a single component or assembled by multiple components. In some example embodiments, the image sensor 171 used in the present embodiment is directly attached to a substrate 172 in the form of a chip on board (COB) package, and such package is different from traditional chip scale packages (CSP) since COB package does not require a cover glass before the image sensor 171 in the optical imaging lens 1. Aforesaid exemplary embodiments are not limited to this package type and could be selectively incorporated in other described embodiments.

An air gap may be formed between any two adjacent lens elements of the six lens elements 110, 120, 130, 140, 150, positioned in the lens barrel 23.

The module housing unit 24 may comprise a lens backseat 2401 for positioning the lens barrel 23 and an image sensor base 2406 positioned between the lens backseat 2401 and the image sensor 171. The lens barrel 23 and the lens backseat 2401 may be positioned along a same axis I-I', and the lens backseat 2401 may be positioned at the inside of the lens barrel 23. The image sensor base 2406 may be, in some embodiments, close to the lens backseat 2401 here. The image sensor base 2406 could be optionally omitted in some other embodiments of the present disclosure.

Because the length of the optical imaging lens 1 may be merely 4.204 mm, the size of the mobile device 20 may be quite small. Therefore, the embodiments described herein can save the production cost of the housing and meets the market demand for smaller sized product designs.

Figure 40:
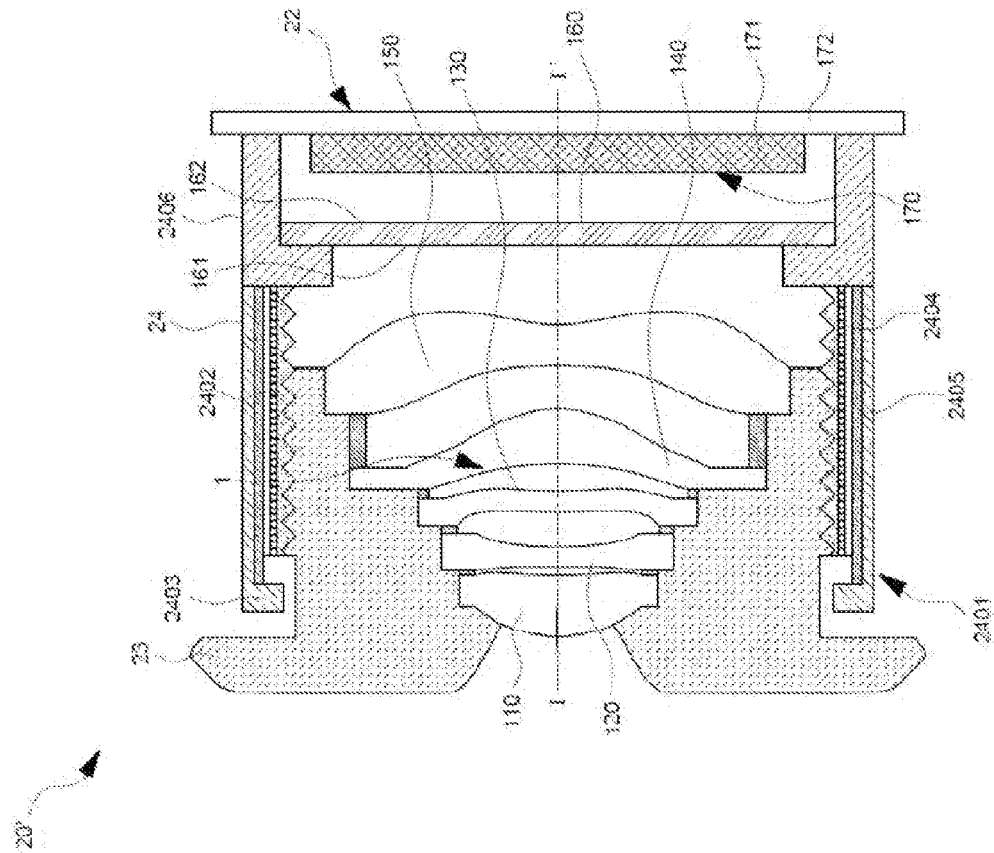
FIG. 40 is a partially enlarged view of the structure of another example embodiment of a mobile device.

Reference is now made to FIG. 40, which shows another structural view of a second embodiment of mobile device 20' applying the aforesaid optical imaging lens 1. One difference between the mobile device 20' and the mobile device 20 may be the lens backseat 2401 comprising a first seat unit 2402, a second seat unit 2403, a coil 2404 and a magnetic unit 2405. The first seat unit 2402 may be close to the outside of the lens barrel 23, and positioned along an axis I-I', and the second seat unit 2403 may be around the outside of the first seat unit 2402 and positioned along with the axis I-I'. The coil 2404 may be positioned between the outside of the first seat unit 2402 and the inside of the second seat unit 2403. The magnetic unit 2405 may be positioned between the outside of the coil 2404 and the inside of the second seat unit 2403.

The lens barrel 23 and the optical imaging lens 1 positioned therein are driven by the first seat unit 2402 for moving along the axis I-I'. The rest structure of the mobile device 20' may be similar to the mobile device 20.

Similarly, because the length of the optical imaging lens 1, 4.204 mm, may be shortened, the mobile device 20' may be designed with a smaller size and meanwhile good optical performance may still be provided. Therefore, the present embodiment may save the production cost of the housing and meets the demand of small sized product design and the request of the market.

According to above illustration, it is clear that the camera device and the optical imaging lens thereof in example embodiments, through controlling the detail structure of the six lens elements, the length of the optical imaging lens may be effectively shortened and meanwhile good optical characters may still be provided.

While various embodiments in accordance with the disclosed principles been described above, it should be understood that they are presented by way of example only, and are not limiting. Thus, the breadth and scope of exemplary embodiment(s) should not be limited by any of the above-described embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the disclosure set out in any claims that may issue from this disclosure. Specifically, a description of a technology in the "Background" is not to be construed as an admission that technology is prior art to any invention(s) in this disclosure. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. An optical imaging lens, sequentially from an object side to an image side along an optical axis, comprising an aperture stop, a first lens element, a second lens element, a third lens element, a fourth lens element, and a fifth lens element, each of said first, second, third, fourth, and fifth lens elements having refractive power, an object-side surface facing toward the object side and an image-side surface facing toward the image side axis, wherein:

said image-side surface of said first lens element comprises a concave portion in a vicinity of the optical axis;

said image-side surface of said second lens element comprises a concave portion in a vicinity of the optical axis;

said object-side surface of said third lens element comprises a convex portion in a vicinity of the optical axis and a concave portion in a vicinity of a periphery of the third lens element;

said image-side surface of said third lens element comprises a concave portion in a vicinity of the optical axis;

said object-side surface of said fourth lens element comprises a concave portion in a vicinity of the optical axis;

said object-side surface of said fifth lens element comprises a concave portion in a vicinity of the optical axis; and wherein said optical imaging lens comprises no other lenses having refractive power beyond the five lens elements, wherein a sum of the thickness of all five lens elements along the optical axis is ALT, an air gap between the fourth lens element and the fifth lens element along the optical axis is G45, and ALT and G45 satisfy the equation:

$$ALT/G45 \leq 4.5.$$

2. The optical imaging lens according to claim 1, wherein the central thickness of the first lens element along the optical axis is T1, and T1 and ALT satisfy the equation:

$$ALT/T1 \leq 4.5.$$

3. The optical imaging lens according to claim 1, wherein the central thickness of the fourth lens element along the optical axis is T4, and T4 and ALT satisfy the equation:

$ALT/T4 \geq 2.9$.

4. The optical imaging lens according to claim 1, wherein the central thickness of the first lens element along the optical axis is T1, the central thickness of the fourth lens element along the optical axis is T4, and T1 and T4 satisfy the equation:

$T4/T1 \leq 1.5$.

5. The optical imaging lens according to claim 1, wherein the central thickness of the fourth lens element along the optical axis is T4, the central thickness of the fifth lens element along the optical axis is T5, and T5 and T4 satisfy the equation:

$T4/T5 \leq 1.6$.

6. The optical imaging lens according to claim 1, wherein a sum of all four air gaps from the first lens element to the fifth lens element along the optical axis is Gaa, the central thickness of the first lens element along the optical axis is T1, and T1 and Gaa satisfy the equation:

$Gaa/T1 \geq 1.55$.

7. The optical imaging lens according to claim 1, wherein the central thickness of the second lens element along the optical axis is T2, and T2 and G45 satisfy the equation:

$1.5 \leq G45/T2 \leq 3.0$.

8. The optical imaging lens according to claim 1, wherein an air gap between the third lens element and the fourth lens element along the optical axis is G34, the central thickness of the second lens element along the optical axis is T2, and T2 and G34 satisfy the equation:

$G34/T2 \geq 1.3$.

9. The optical imaging lens according to claim 1, wherein an air gap between the third lens element and the fourth lens element along the optical axis is G34, the central thickness of the fourth lens element along the optical axis is T4, and T4 and G34 satisfy the equation:

$G34/T4 \geq 0.5$.

10. The optical imaging lens according to claim 1, wherein an air gap between the third lens element and the fourth lens element along the optical axis is G34, the central thickness of the fourth lens element along the optical axis is T4, and T4 and G34 satisfy the equation:

$G34/T4 \leq 2.0$.

11. The optical imaging lens according to claim 1, wherein the central thickness of the fifth lens element along the optical axis is T5, and T5 and ALT satisfy the equation:

$ALT/T5 \leq 6.02$.

12. The optical imaging lens according to claim 1, wherein the central thickness of the first lens element along the optical axis is T1, the central thickness of the fifth lens element along the optical axis is T5, and T5 and T1 satisfy the equation:

$T5/T1 \leq 1.1$.

13. The optical imaging lens according to claim 1, wherein the central thickness of the second lens element along the optical axis is T2, the central thickness of the fifth lens element along the optical axis is T5, and T5 and T2 satisfy the equation:

$T5/T2 \geq 1.4$.

14. The optical imaging lens according to claim 13, wherein an air gap between the second lens element and the third lens element along the optical axis is G23, the central thickness of the fourth lens element along the optical axis is T4, and T4 and G34 satisfy the equation:

$T4/G23 \leq 1.87$.

15. The optical imaging lens according to claim 1, wherein the central thickness of the fifth lens element along the optical axis is T5, and T5 and G45 satisfy the equation:

$G45/T5 \leq 3.0$.

16. The optical imaging lens according to claim 15, wherein a sum of all four air gaps from the first lens element to the fifth lens element along the optical axis is Gaa, the central thickness of the second lens element along the optical axis is T2, and T2 and Gaa satisfy the equation:

$Gaa/T2 \geq 4.5$.

17. The optical imaging lens according to claim 1, wherein the central thickness of the third lens element along the optical axis is T3, and T3 and G45 satisfy the equation:

$1.2 \leq G45/T3 \leq 2.8$.

18. The optical imaging lens according to claim 1, wherein an air gap between the third lens element and the fourth lens element along the optical axis is G34, the central thickness of the third lens element along the optical axis is T3, and T3 and G34 satisfy the equation:

$G34/T3 \geq 1.0$.

19. A mobile device, comprising:
a housing; and
a photography module positioned in the housing and comprising:
an optical imaging lens, sequentially from an object side to an image side along an optical axis, comprising an aperture stop, a first lens element, a second lens element, a third lens element, a fourth lens element, and a fifth lens element, each of said first, second, third, fourth, and fifth lens elements having refractive power, an object-side surface facing toward the object side and an image-side surface facing toward the image side axis, wherein:
said image-side surface of said first lens element comprises a concave portion in a vicinity of the optical axis;
said image-side surface of said second lens element comprises a concave portion in a vicinity of the optical axis;
said object-side surface of said third lens element comprises a convex portion in a vicinity of the optical axis and a concave portion in a vicinity of a periphery of the third lens element;
said image-side surface of said third lens element comprises a concave portion in a vicinity of the optical axis;
said object-side surface of said fourth lens element comprises a concave portion in a vicinity of the optical axis;
said object-side surface of said fifth lens element comprises a concave portion in a vicinity of the optical axis; and wherein said optical imaging lens comprises no other lenses having refractive power beyond the five lens elements, wherein a sum of the thickness of all six lens elements along the optical axis is ALT, an air gap between the fourth lens element and the fifth lens element along the optical axis is G45, and ALT and G45 satisfy the equation:

$ALT/G45 \leq 4.5$; and a lens barrel for positioning the optical imaging lens;
a module housing unit for positioning the lens barrel;
a substrate for positioning the module housing unit; and
an image sensor positioned at the image side of the optical imaging lens.

* * * * *